United States Patent
Imai

[11] Patent Number: 5,998,801
[45] Date of Patent: Dec. 7, 1999

[54] SURFACE POSITION DETECTING METHOD, SURFACE POSITION ADJUSTING APPARATUS AND PROJECTION EXPOSURE APPARATUS EFFECTING ACCURATE POSITIONING OF A SUBSTRATE

[75] Inventor: Yuji Imai, Omiya, Japan

[73] Assignee: Nikon Corporation, Tokyo, Japan

[21] Appl. No.: 09/281,095

[22] Filed: Mar. 30, 1999

Related U.S. Application Data

[63] Continuation of application No. 08/846,213, Apr. 28, 1997, abandoned.

[30] Foreign Application Priority Data

May 9, 1996 [JP] Japan .................................. 8-189511

[51] Int. Cl.$^6$ .................................................. G01N 21/86
[52] U.S. Cl. ......................... 250/548; 356/400; 355/53; 250/559.4
[58] Field of Search ................... 250/548, 559.4; 356/375, 399–401; 355/53, 55

[56] References Cited

U.S. PATENT DOCUMENTS

| | | |
|---|---|---|
| 4,714,331 | 12/1987 | Oda et al. . |
| 5,323,016 | 6/1994 | Yamada et al. .......................... 356/401 |
| 5,361,122 | 11/1994 | Kataoka et al. ........................... 355/53 |
| 5,448,332 | 9/1995 | Sakakibara et al. ...................... 355/53 |
| 5,502,311 | 3/1996 | Imai et al. . |
| 5,510,892 | 4/1996 | Mizutani et al. ........................ 356/375 |
| 5,569,930 | 10/1996 | Imai ........................................ 250/548 |
| 5,587,794 | 12/1996 | Mizutani et al. . |
| 5,742,397 | 4/1998 | Kim ........................................ 356/399 |
| 5,747,202 | 5/1998 | Tanaka ..................................... 430/30 |

FOREIGN PATENT DOCUMENTS 5-280929 10/1993 Japan .

*Primary Examiner*—Stephone Allen
*Attorney, Agent, or Firm*—Nixon & Vanderhye P.C.

[57] ABSTRACT

A projection area (exposure area) on a wafer W, in which a mask pattern is transferred, is divided into, for example, four quadrants. A slit or X-shaped pattern is projected by a light-transmitting optical system so that a plurality of images are formed at a regular interval in the projection area on the wafer W. Luminous flux reflected from the images on the wafer W is received by a light-receiver and converted into photoelectric signals. A master controller calculates the focal values of the first through fourth quadrants along the optical axis based on the photoelectric signals. An optimum focal position and a leveling amount are determined based on the focal values of the first through fourth quadrants. Even if there are level differences in the wafer surface, the optimum focal position and the leveling amount can be accurately determined.

121 Claims, 12 Drawing Sheets

SURFACE POSITION DETECTING METHOD, SURFACE POSITION ADJUSTING APPARATUS AND PROJECTION EXPOSURE APPARATUS EFFECTING ACCURATE POSITIONING OF A SUBSTRATE

This is a continuation of application Ser. No. 08/846,213, filed Apr. 28, 1997, now abandoned.

BACKGROUND OF THE INVENTION

This invention relates to a surface position detecting method, a surface position adjusting apparatus, and a projection exposure apparatus. More particularly, the invention relates to a surface position detecting method for detecting a surface position in which a pattern image of a first object is formed through a projection optical system within a projection area on the surface of a second object, a surface position adjusting apparatus for bringing an area of the surface of the second object into alignment with the image plane of the projection optical system, and a projection exposure apparatus using the surface adjusting apparatus.

Various types of exposure apparatus are known that are used in a photolithographic process for manufacturing a semiconductor device, liquid crystal display or others. Typically, an exposure apparatus is used that exposes and transfers the pattern of a photomask or reticle (comprehensively referred to as a reticle) through a projection optical system onto a wafer or substrate coated with a photosensitizer.

For example, a reduction projection exposure apparatus for manufacturing a semiconductor device uses a projection lens system having a large numerical aperture (N.A.). In such an exposure apparatus, the focal depth is very shallow, and therefore, a mechanism is provided for bringing the wafer surface into alignment with the image plane of the projection lens system on the substrate. A conventional reduction projection exposure apparatus has an autofocus mechanism for adjusting the vertical position of the wafer surface along the optical axis of the projection lens system and a leveling mechanism for adjusting the inclination of the wafer to make the wafer surface align with the image plane of the projection lens system on the substrate. Japanese Patent Application No. 5-190423 (U.S. Pat. No. 5,502,311), discloses an oblique incidence type exposure apparatus having a multipoint AF system, in which the vertical position along the optical axis and inclination of the wafer are simultaneously detected. With the multipoint AF system, the vertical positions, along the optical axis of the projection lens system, of three or more points on the wafer surface are detected to calculate the inclination of the wafer surface.

The conventional autofocus mechanism, however, generally detects the vertical position of the substrate surface only in a portion of the exposure area, even with a multipoint AF system. If there are level differences in an exposure area to apply, for example, one-shot-four-chip or one-shot-six-chip exposure, these level differences cannot be detected accurately due to the limited number of detection points. Consequently, the focussing operation of the substrate can be inaccurate.

SUMMARY OF THE INVENTION

It is an object of the invention to provide a surface position detecting method that overcomes the drawbacks in the prior art that accurately detects the surface position of an object to which a pattern image is projected, even if there are level differences in the projection area.

It is another object of the invention to provide a surface position adjusting apparatus that can bring the surface of a projected object into a desired position relative to the image plane of the projection optical system, even if there are level differences in the projection area.

These and other objects of the invention are achieved by providing a surface position detecting method for detecting a surface position of a projection area on a substrate, a pattern being projected onto the projection area as a pattern image through a projection optical system. The method includes the steps of (a) dividing the projection area into four quadrants, (b) projecting a plurality of patterns to form at least one image in each quadrant of the projection area, (c) receiving luminous flux reflected from the images, (d) converting the luminous flux into photoelectric signals, (e) calculating respective focal values of the four quadrants along a projection optical system optical axis based on the photoelectric signals, and (f) calculating an optimum focal position along the optical axis and a leveling amount based on the focal values.

In accordance with another aspect of the invention, there is provided a surface position adjusting apparatus for aligning a desired surface area of a substrate with an image plane of a projection optical system. The projection optical system projects a pattern onto a projection area on the surface of the substrate as a pattern image. The surface position adjusting apparatus includes a light-transmitting optical system that projects at least four images along an optical path within the projection area on the substrate, a light-receiving optical system disposed in the optical path that receives luminous flux reflected from the images on the substrate and converts the luminous flux into photoelectric signals, a table on which the substrate is mounted, a driving system coupled with the table that drives the table along the optical axis and adjusts an inclination of the table with respect to the optical axis, an operation unit communicating with the light-receiving optical system, the operation unit calculating an optimum focal position and a leveling amount of the substrate based on the photoelectric signals, and a controller communicating with the operation unit and the driving system, the controller controlling the driving system based on the optimum focal position and the leveling amount.

In accordance with still another aspect of the invention, there is provided a projection exposure apparatus for transferring a pattern formed on a mask through a projection optical system onto a photosensitive substrate as a pattern image. The projection exposure apparatus includes a light-transmitting optical system that projects at least four slit images along an optical path within a projection area on the photosensitive substrate, a light-receiving optical system disposed in the optical path that receives luminous flux reflected from the slit images on the photosensitive substrate and converts the luminous flux into photoelectric signals, a substrate table on which the photosensitive substrate is mounted, a driving system coupled with the substrate table that drives the substrate table along the optical axs and adjusts an inclination of the substrate table with respect to the optical axi, an operation unit communicating with the light-receiving optical system, the operation unit calculating an optimum focal position along the optical axis and a leveling amount of the photosensitive substrate based on the photoelectric signals, and a controller communicating with the operation unit and the driving system, the controller controlling the driving system based on the optimum focal position and the leveling amount.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

An embodiment of the invention will be described with reference to FIGS. 1 through 9.

Figure 1:
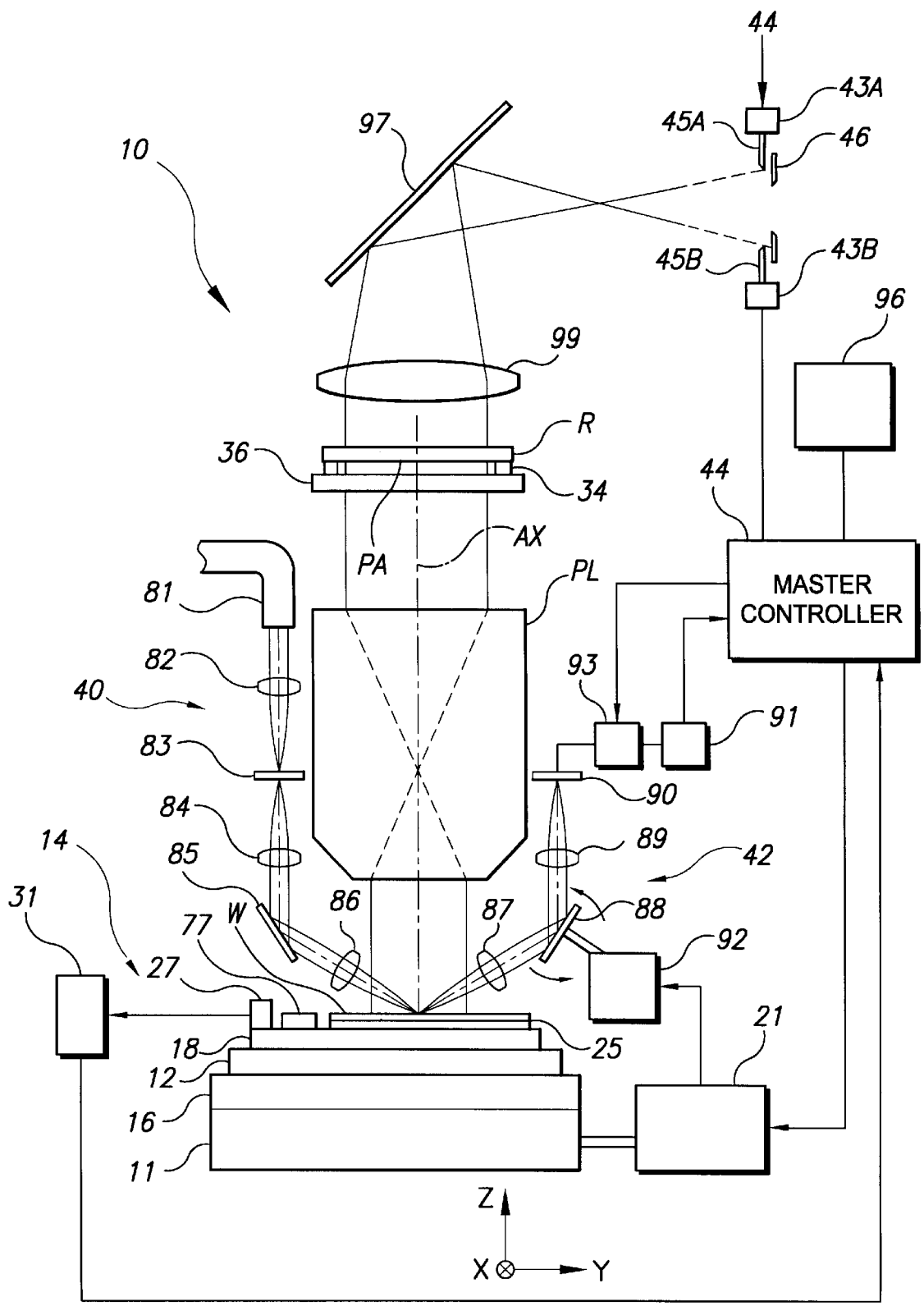
FIG. 1 is a schematic diagram of the exposure apparatus according to an embodiment of the invention.

FIG. 1 illustrates the projection exposure apparatus 10 according to an embodiment of the present invention. The projection exposure apparatus 10 is a reduction projection exposure apparatus of a step-and-repeat type.

The projection exposure apparatus 10 has an XY stage 14 that includes a substrate table 18 supporting a wafer W as a photosensitive substrate. The substrate table moves in the X and Y directions within a reference plane. The projection exposure apparatus 10 also has a projection lens system PL positioned above the XY stage apparatus 14. The projection lens system PL has an optical axis AX extending in the Z direction and perpendicular to the reference plane. A mask or reticle R is held by the reticle holder 36 above the projection lens system PL so as to be perpendicular to the optical axis AX of the projection lens system PL. When used in a reduction projection exposure apparatus, a mask is called a reticle.

The XY stage 14 further includes a base 11, a Y stage 16 that is movable back and forth in the Y direction (FIG. 1) on the base 11, and an X stage that is movable back and forth in the X direction, which is perpendicular to the Y direction, on the Y stage 16. The substrate table 18 is positioned on the X stage 12. A wafer holer 25 is mounted on the substrate table 18 to support the photosensitive substrate (wafer W) through known vacuum adsorption.

The two-dimensional position (in the X and Y directions) of the substrate table 18 is maintained on the X stage 12, and the substrate table 18 is movable in the Z direction and in directions about the X and Y axes (tilting direction). Moving mirrors 27 are fixed onto the substrate table 18. An external interferometer 31 detects the light beams reflected by the moving mirrors 27 to monitor the position of the substrate table 18 in the X, Y and θ (rotational angle about the Z axis) directions. The position information obtained by the interferometer 31 is supplied to a master controller 44. The master controller 44 controls the positioning of the Y stage 16, the X stage 12 and the substrate table 18 through the wafer driving unit 21 in the driving system, while comprehensively controlling the entire operation of the apparatus.

A reference mark plate 77 is fixed to the substrate table 18 along the side thereof. Reference marks are formed on the reference mark plate 77 for making various types of measurements, including a base-line amount measurement for determining the distance between the detection center of the off-axis type alignment detection system (not shown) and the optical axis AX of the projection lens system PL.

Vacuum adsorption areas 34 are provided in the four corners of the top surface of the reticle holder 36. The reticle holder 36 has an aperture (not shown) corresponding to the pattern area PA of the reticle R, in which a circuit pattern is formed. The reticle holder 36 is slightly moved by a driving mechanism (not shown) in the X,Y and θ (rotational angle about the Z axis) directions to register the reticle R in a correct position such that the optical axis AX of the projection lens system passes through the center of the pattern area PA (i.e, the reticle center).

The reticle R and the wafer W are aligned with each other by the master controller 44 based on the detection signal from the alignment detection system (not shown). The substrate table 18 is driven in the Z direction and tilting direction by the master controller 44 through the driving unit 21 based on the detection signal from the focal point detection system, the details of which will be described below, so that the wafer surface and the pattern plane of the reticle R are conjugate with respect to the projection lens system PL and so that the wafer surface is aligned with the image-forming plane of the projection lens system, thereby adjusting the surface position of the wafer W. When positioning and focusing of the apparatus are completed, the illumination optical system, which includes a mirror 97 and a main condenser lens 99, emits exposure light to illuminate the pattern area PA of the reticle R with substantially uniform illuminance. Then, a reduced pattern image of the reticle R is formed on the wafer W coated with photoresist.

Although not shown in the figure, the illumination optical system has a light source, such as mercury vapor lamp, an elliptical mirror for collecting the exposure light emitted from the light source, and an input lens for converting the collected exposure light into substantially parallel luminous flux. The luminous flux output from the input lens enters a fly-eye lens, which is also included in the illumination optical system, and forms a plurality of secondary light sources on the focal plane of the rear side (reticle side) thereof. The exposure light beams emitted from the secondary light sources are collected by the condenser lens in the illumination optical system, and illuminate the reticle R with uniform illuminance. In this embodiment, two movable blinds (or blades) 45A, 45B are provided in the illumination optical system. The surface on which the movable blinds 45A, 45B are positioned is conjugate with the pattern plane of the reticle R. A fixed blind 46, which has a fixed aperture, is positioned near the movable blinds 45A, 45B. The fixed blind 46 is a field stop with, for example, a rectangular aperture surrounded by four knife edges. The vertical length of the rectangular aperture is defined by the movable blinds 45A, 45B. The movable blinds 45A, 45B are driven by the driving mechanisms 43A, 43B, respectively, so as to open or close. The operation of the driving mechanisms 43A, 43B is controlled by the master controller 44 according to masking information supplied from a main computer (not shown).

When the wafer W is positioned within the projection area in which a pattern image is formed through the projection lens system PL, the Z position of the wafer surface along the optical axis AX is detected. (The area on the wafer W corresponding to the projection area is referred to as an exposure area.) To detect the Z position of the wafer surface, an oblique incidence type multipoint focal position detecting system is used. The multipoint focal position detecting system comprises an illumination optical system 40, which serves as a light-transmitting optical system, and a light-receiving optical system 42. The illumination optical system 40 includes an optical fiber flux 81, a collective lens 82, a pattern plate 83, a lens 84 such as a collimating lens, a mirror 85, and an illuminating objective lens 86. The light-receiving optical system 42 includes a collecting objective lens 87, a rotatable diaphragm 88, an imagery lens 89, and a light-receiving unit 90 (which will be described below) having multiple photosensors.

In this arrangement, illumination light, which has a wavelength different from the exposure light EL and does not expose the photoresist on the wafer W, is emitted from the light source of the light-transmitting optical system (not shown). The illumination light is guided by the fiber flux 81 to the pattern plate 83, which has a plurality of slit apertures, through the collective lens 82. The light having passed through the pattern plate 83 is projected, through the lens 84, such as a collimating lens, the mirror 85, and illuminating objective lens 86, onto the exposure area of the wafer W. The slit pattern on the patten plate 83 is formed on the exposure area of the wafer W. The illumination light (luminous flux) of the slit image reflected by the wafer W is then guided through the collecting objective lens 87, the rotational diaphragm 88 and the imagery lens 89 to the light-receiving plane of the light-receiving unit 90. Thus, the slit pattern of the pattern plate 83 is again formed on the light-receiving unit 90. The master controller 44 vibrates the rotational diaphragm 88 through a vibrator 92. A plurality of photosensors are provided in the light-receiving unit 90, which supply detection signals (photoelectric signals) to the signal processor 91 through the sensor selection circuit 93. The photoelectric signals are demodulated in synchronization with a driving signal from the vibrator 92 to generate a plurality of focal position signals. The signal processor 91 supplies the focal position signals to the master controller 44. Details of the sensor selection circuit 93 and the signal processor 91 will be described below.

Figure 2A:
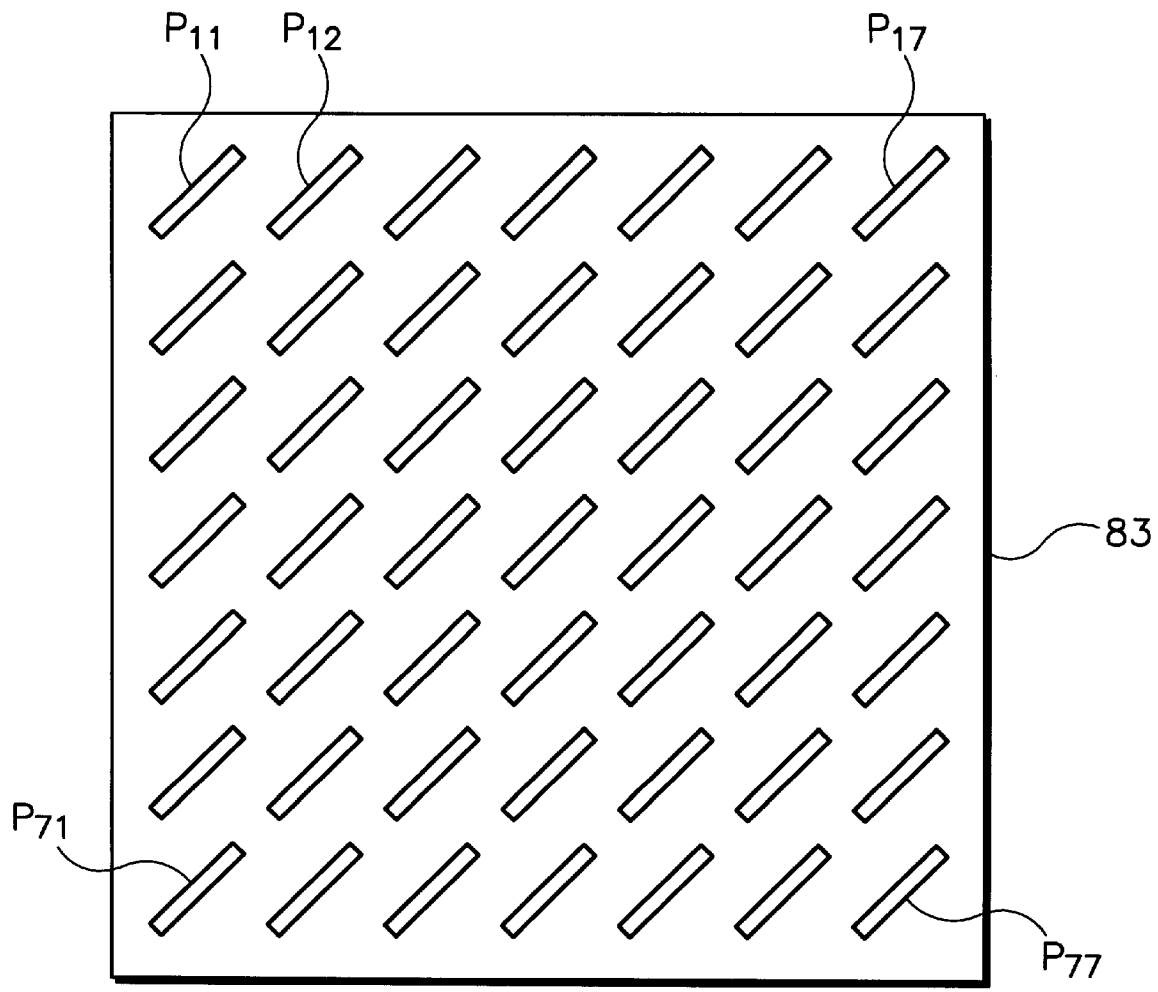
FIG. 2(A) is a plan view of the pattern plate shown in FIG. 1.
Figure 2B:
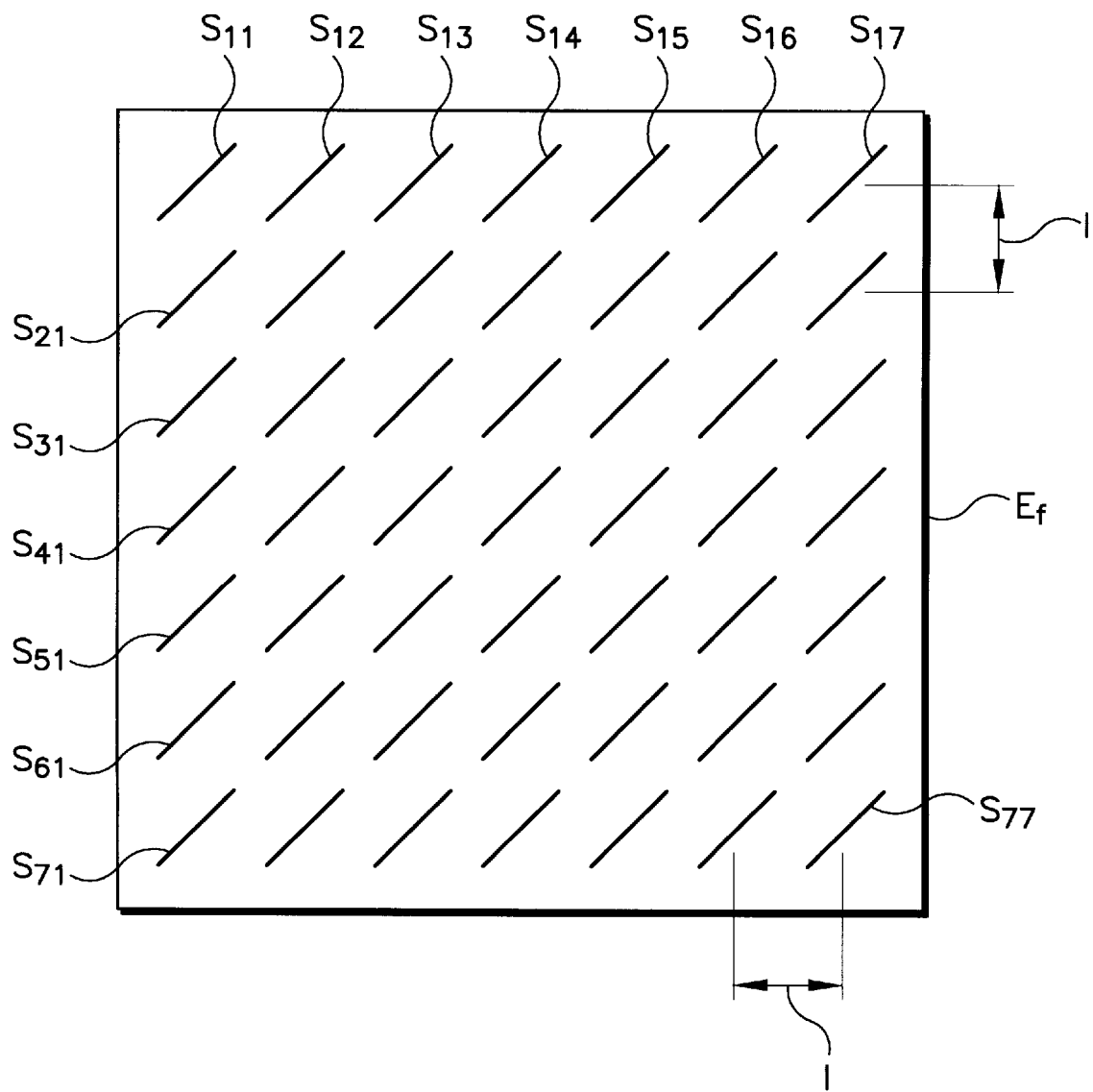
FIG. 2(B) shows the slit pattern images formed on the projection area on the wafer.
Figure 2C:
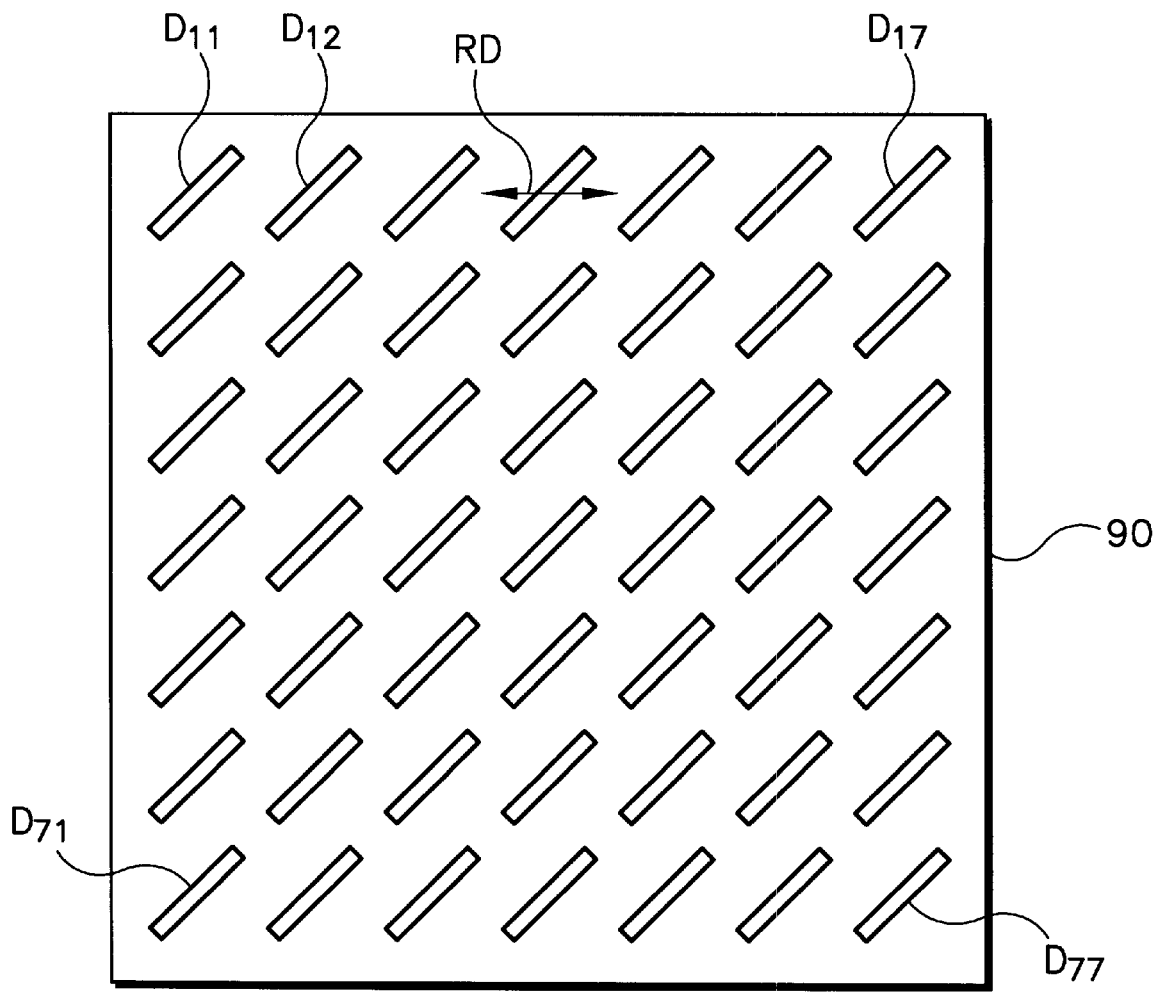
FIG. 2(C) shows the photosensor arrangement on the light-receiving plane of the light-receiving unit.

FIG. 2(A)–(C) illustrate the slit pattern on the pattern plate 83, the pattern image being formed in the exposure area on the wafer W, and the photosensor arrangement being formed on the light-receiving unit 90.

FIG. 2(A) shows a pattern plate 83, on which forty nine (7×7) slit apertures $P_{11}$–$P_{77}$ are formed at a regular interval, which are oblique by 45° with respect to the sides (X and Y axes) of the plate. The pattern P of the slit apertures is projected by the light-transmitting optical system 40 onto the exposure area of the wafer W. Luminous flux of the slit images are emitted by the light-transmitting optical system 40 to the wafer W (or the surface of the reference mark plate 77) obliquely at an angle α with respect to the optical axis AX in the YZ plane. The luminous flux is reflected from the slit image on the wafer surface and advances to the light-receiving optical system 42 again obliquely at an angle α with respect to the optical axis. Thus, the optical paths of the incident light and the reflected light are symmetric with respect to the optical axis in the YZ plane.

FIG. 2(B) shows the exposure area Ef on the wafer W, in which forty nine slit images $S_{11}$–$S_{77}$ tilting 45° with respect to the X and Y axes are formed in the 7×7 matrix at a constant interval l along the X and Y axes. Although forty nine (7×7=49) slit images are formed in the exposure area Ef in the figures, the number of the slit images S may be any number as long as the slit images are formed at a regular interval in the lateral and vertical directions.

If the exposure area Ef is a square of 22×22 $mm^2$, the interval l is about 3 mm. This arrangement allows the level differences within the exposure area Ef to be sufficiently detected.

FIG. 2(C) shows the light-receiving plane of the light-receiving unit 90, in which photosensors $D_{11}$–$D_{77}$ are arranged in a matrix of 7×7 corresponding to the slit images $S_{11}$–$S_{77}$. The photosensors D tilt 45° with respect to the X and Y axes.

Slit-like diaphragms (not shown), which also tilt 45° with respect to the X and Y axes, are positioned in front of the photosensors $D_{11}$–$D_{77}$ (i.e., in the lower plane in FIG. 1), corresponding to the photosensors D. The slit images $S_{11}$–$S_{77}$ of FIG. 2 are formed on the photosensors $D_{11}$–$D_{77}$, respectively. Because the light reflected from the exposure surface of the wafer W is vibrated through the rotational diaphragm 88, the slit images formed on the light-receiving unit 90 vibrate in the direction RD indicated by the arrow in FIG. 2(C). Photoelectric signals detected by the photosensors $D_{11}$–$D_{77}$ are demodulated by the signal processor 91 through the sensor selection circuit 93 in synchronization with a signal of the rotational vibration frequency.

Figure 3:
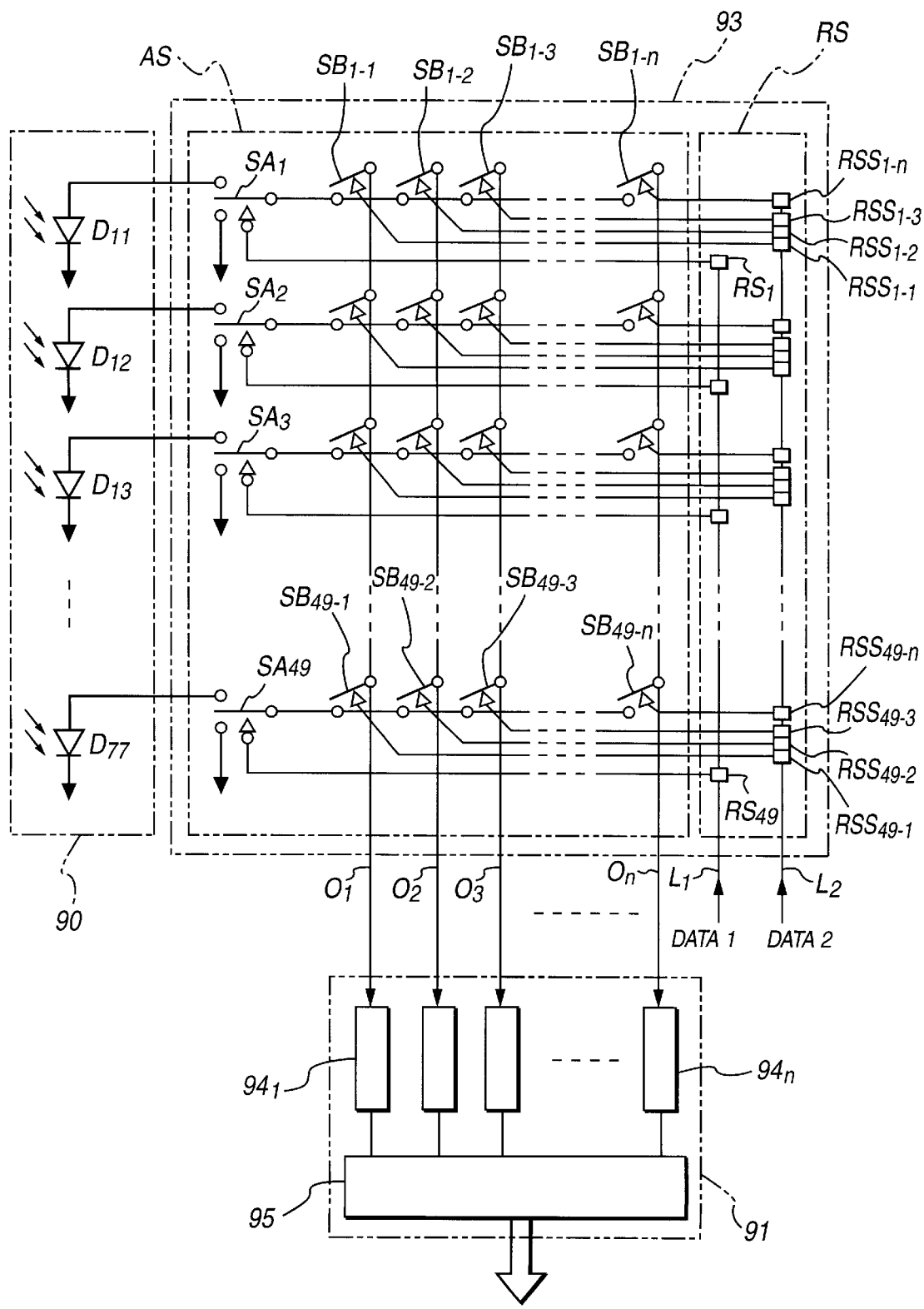
FIG. 3 is a block diatn showing the structures of the sensor selection circuit, the signal processor and the light-receiving unit.

FIG. 3 schematically shows the sensor selection circuit 93, the signal processor 91, and the light-receiving unit 90. The sensor selection circuit 93 has a switch unit AS and a register unit RS. The switch unit AS includes forty nine switches $SA_1$–$SA_{49}$, and forty-nine opening/closing switches $SB_{1-1}$, $SB_{1-2}$, ..., $SB_{1-n}$, $SB_{2-1}$, ..., $SB_{2-n}$, ..., $SB_{49-n}$. One fixed contact of each switch SA is connected to the P side of a photosensor (photodiode in this example) D, to which reverse bias voltage is applied. The opening/closing switches $SB_{1-1}$, ..., $SB_{1-n}$ are provided between the moving contact (common contact) of the switch $SA_1$ and n output lines $O_1$–$O_n$. Similarly switches $SB_{2-1}$, ..., $SB_{2-n}$, are provided between the moving contact (common contact) of the switch $SA_2$ and n output lines $O_1$–$O_n$, and switches $SB_{49-1}$, ..., $SB_{49-n}$ are provided between the moving contact (common contact) of the switch $SA_{49}$ and n output lines $O_1$–$O_n$. The other fixed contacts of the switches $SA_1$–$SA_{49}$ are grounded. The N side of the photosensors $D_{11}$–$D_{77}$ are connected to the power source (not shown). The output lines $O_1$–$O_n$, which constitute an output circuit for photoelectric signals, are connected to the signal processing units $94_1$–$94_n$ provided corresponding to the respective output lines.

If the switch $SA_1$ is connected to the photosensor $D_{11}$, and if the opening/closing switch $SB_{1-1}$ is turned on, then reverse current (i.e., photocurrent represented by a photoelectric signal) proportional to the light intensity received at the photosensor $D_{11}$ flows in the closed circuit from the photosensor $D_{11}$, through switch $SA_1$ and switch $SB_{1-1}$. The photocurrent is detected by the signal processing unit $94_1$ and converted to a digital signal, which is then supplied to the signal output circuit 95. Similarly, if the switch $SA_{49}$ is connected to the photosensor $D_{77}$ with the opening/closing switch $SB_{49-n}$, in the ON state, then reverse current (photocurrent) proportional to the light intensity received at the photosensor $D_{77}$ flows in the closed circuit from the photosensor $D_{77}$, through switch $SA_{49}$ and switch $SB_{49-n}$. The photocurrent is detected by the signal processing unit $94_n$, converted to a digital signal, and supplied to the signal output circuit 95. By turning on a switch SA and an opening/closing switch SB at a given combination, photo-current representing the light intensity received at a desired photosensor D can be extracted from the associated output line O.

The register RS includes a first register group of forty nine registers $RS_1$–$RS_{49}$ corresponding to the switches $SA_1$–$SA_{49}$, and a second register group of forty-nine registers $RSS_{1-1}$–$RSS_{49-n}$, corresponding to the opening/closing switches $SB_{1-1}$–$SB_{49-n}$. The first group registers $RS_1$–$RS_{49}$ are connected to a common Line L1. The second group registers $RSS_{1-1}$–$RSS_{49-n}$ are connected to a common line L2. To output the signal from, for example, the photosensor $D_{11}$ to the output line $O_1$, data 1 "1, 0, 0, 0, . . . , 0 (49 bits)" is input to the line L1, and data 2 "1, 0, 0, . . . , 0, 0, 0 (49×n bits)" is input to the line L2. In this case, only the first register $RS_1$ and the second register $RSS_{1-1}$ are rendered "1", and the other registers are "0". Thus, the switch $SA_1$ is connected to the photosensor $D_{11}$ while turning on the switch $SB_{1-1}$, thereby supplying the output of the photosensor $D_{11}$, to the output line $O_1$. By supplying appropriate data 1 and 2 to the register unit RS through the lines L1 and L2, respectively, the master controller 44 controls the sensor selection circuit so that a signal of a desired photosensor D is output to the corresponding output line O, and then to the signal processing unit 94. Supposing n=49, if each of the photosensors D is independently connected to one of the signal processing units $94_1$–$94_{49}$ then the master controller 44 can calculate the Z positions of all the slit images in the exposure area. If signals from the photosensors D included in a quadrant are output to a common output Line the average level difference (focal position) can be calculated for each quadrant without calculating the Z position of an individual slit image.

The signal processor 91 is connected to the output lines $O_1$–$O_n$ and has n signal processing units $94_1$–$94_n$. Each of the signal processing units $94_1$–$94_n$ demodulates the photoelectric signal from the corresponding output line in synchronization with a signal of rotational vibration frequency, and generates a focal position signal representing the Z position (focal position) of the associated slit image on the wafer W. The focal position signals from the signal processing units $94_1$–$94_n$ are digitized and output to the master controller 44 as serial data. If the signals from a plurality of photosensors D are output to a common line (signal processing unit), the selected signal processing unit 94 demodulates the composite signal of the outputs from the multiple photosensors D in synchronization with a signal of rotational vibration frequency, and generates a focal position signal corresponding to the composite signal. The digital data of the focal position signal is output to the master controller 44.

The master controller 44 of the exposure apparatus 10 calculates an optimum focal position and a leveling amount. An exposure area Ef on the wafer W is divided into the first through fourth quadrants, and focal values (Z1, Z2, Z3, Z4) are obtained in the respective quadrants. There are four modes for calculating the optimum focal position, namely, a first mode in which the average of the focal values (Z1, Z2, Z3, Z4) of the first through fourth quadrants is calculated as the optimum focal position ($Z_{AV}$), a second mode in which the maximum focal value $Z_{max}$ is calculated as the optimum focal position ($Z_{AV}$) among the focal values (Z1, Z2, Z3, Z4), a third mode in which the minimum focal value $Z_{min}$ is calculated as the optimum focal position ($Z_{AV}$) among the focal values (Z1, Z2, Z3, Z4), and a fourth mode in which the average of the maximum and minimum values (($Z_{max}$+ $Z_{min}$)/2) is calculated as the optimum focal position ($Z_{AV}$). One of the four modes can be set through the input unit 96 (FIG. 1), such as a console, connected to the master controller.

Figure 4:
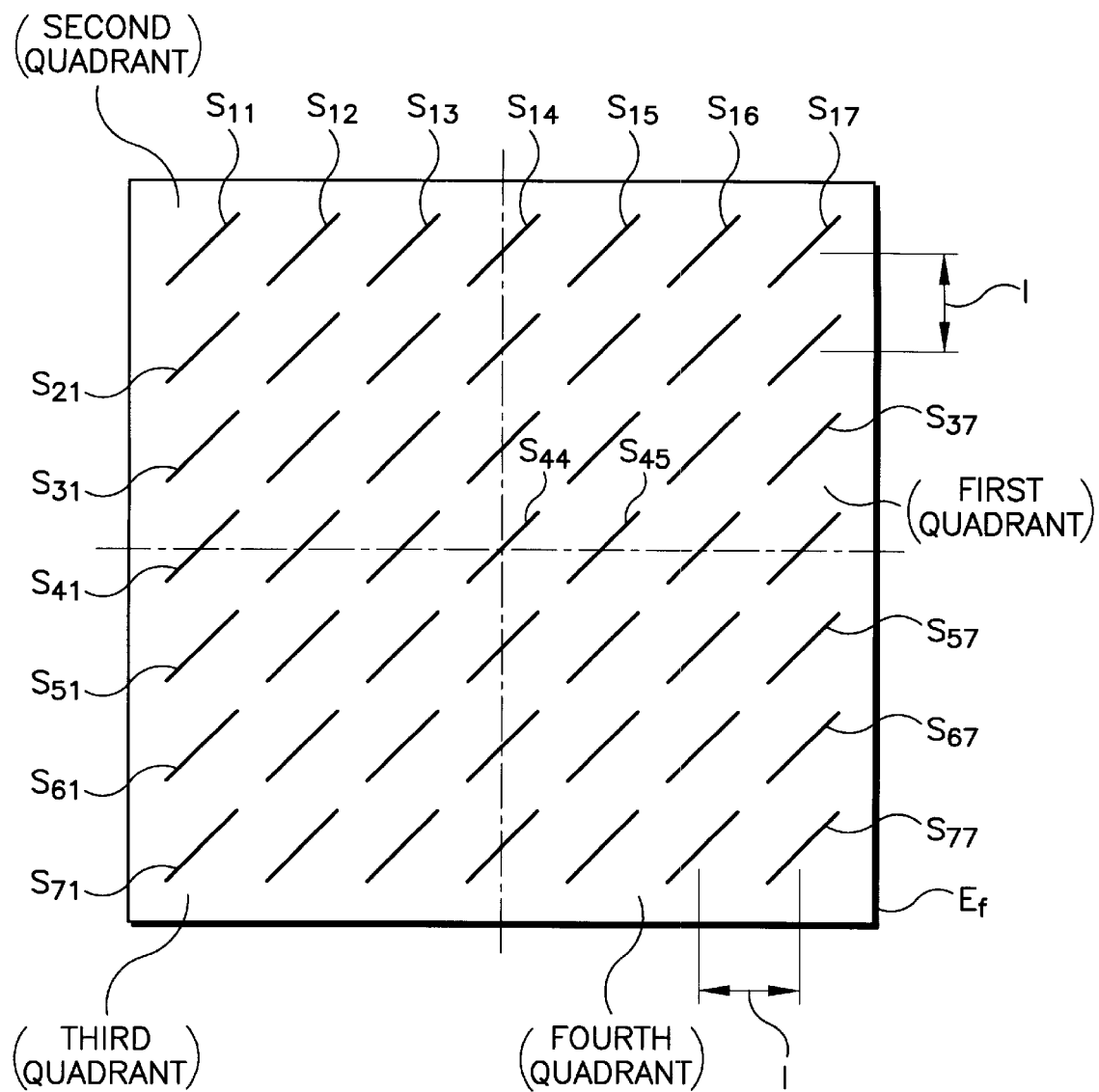
FIG. 4 illustrates the slit images formed on the projection area divided into four quadrants.

The operation for setting a mode will be explained below. FIG. 4 shows the slit image arrangement on the exposure area Ef divided into four quadrants. The first quadrant includes slit images $S_{15}$–$S_{17}$, $S_{25}$–$S_{27}$, and $S_{35}$–$S_{37}$, the second quadrant includes slit images $S_{11}$–$S_{13}$, $S_{21}$–$S_{23}$, and $S_{31}$–$S_{33}$, the third quadrant includes slit images $S_{55}$–$S_{53}$, $S_{61}$–$S_{63}$, and $S_{71}$–$S_{73}$, and the fourth quadrant includes slit images $S_{55}$–$S_{57}$, $S_{65}$–$S_{67}$, and $S_{75}$–$S_{77}$.

The master controller 44 inputs data 1 and data 2, such that photosensors $D_{15}$–$D_{17}$, $D_{25}$–$D_{27}$, and $D_{35}$–$D_{37}$ are connected to the output line $O_1$, photosensors $D_{11}$–$D_{13}$, $D_{21}$–$D_{23}$, and $D_{31}$–$D_{33}$ are connected to the output line $O_2$, photosensors $D_{51}$–$D_{53}$, $D_{61}$–$D_{63}$, and $D_{71}$–$D_{73}$ are connected to the output line $O_3$, photosensors $D_{55}$–$D_{57}$, $D_{65}$–$D_{67}$, and $D_{75}$–$D_{77}$ are connected to the output line $O_4$, and the other photosensors are turned OFF to the register unit RS through the data lines L1 and L2, respectively.

Based on the input data 1 and 2, the connection states of the switches SA and opening/closing switches SB are set to an initial state. As a result, a composite signal of photoelectric signals from photosensors $D_{15}$–$D_{17}$, $D_{25}$–$D_{27}$, and $D_{35}$–$D_{37}$, having received luminous flux reflected from the slit images of the first quadrant, is supplied to the signal processing unit $94_1$ through the output line $O_1$. The signal processing unit $94_1$ outputs a focal position signal as a detection signal of the first quadrant, which represents the composite position of the slit images $S_{15}$–$S_{17}$, $S_{25}$–$S_{27}$, and $S_{35}$–$S_{37}$. Similarly, a composite signal of the photosensors $D_{11}$–$D_{13}$, $D_{21}$–$D_{23}$, and $D_{31}$–$D_{33}$, having received the luminous flux reflected by the slit images on the second quadrant, is supplied to the signal processing unit $94_2$ through the output line $O_2$. The signal processing unit $94_2$ outputs a focal position sinal as a detection signal of the second quadrant, which represents the composite position of the slit images $S_{11}$–$S_{13}$, $S_{21}$–$S_{23}$, and $S_{31}$–$S_{33}$. A composite signal of the photosensors $D_{51}$–$D_{53}$, $D_{61}$–$D_{63}$, and $D_{71}$–$D_{73}$, having received the luminous flux reflected by the slit images on the third quadrant, is supplied to the signal processing unit $94_3$ through the output line $O_3$. The signal processing unit $94_3$ outputs a focal position signal as a detection signal of the third quadrant, which represents the composite position of the slit images $S_{51}$–$S_{53}$, $S_{61}$–$S_{63}$, and $S_{71}$–$S_{73}$. A composite signal of the photosensors $D_{55}$–$D_{57}$, $D_{65}$–$D_{67}$, and $D_{73}$–$D_{77}$, having received the luminous flux reflected by the slit images on the fourth quadrant, is supplied to the signal processing unit $94_4$ through the output line $O_4$. The signal processing unit $94_4$ outputs a focal position signal as a detection signal of the second quadrant, which represents the composite position of the slit images $S_{55}$–$S_{57}$, $S_{65}$–$S_{67}$, and $S_{75}$–$S_{77}$.

The output circuit 95 digitizes the focal position signals from the signal processing units $94_1$–$94_4$ and supplies serial digital detection data to the master controller 44. The master controller 44 calculates the focal values Z1, Z2, Z3, and Z4 of the first through fourth quadrants, respectively, based on the digital detection data supplied in series from the output circuit 95.

If the first mode has been selected as the focal position calculation mode, the master controller 44 calculates the optimum focal position ($Z_{AV}$) according to the following formula:

$$Z_{AV}=(Z1+Z2+Z3+Z4)/4 \qquad (1)$$

The first mode is used most frequently in the general exposure process. The method is suitable for one-shot-two-chip, one-shot-four-chip, or one-shot-six-chip exposure, and the optimum focal position ($Z_{AV}$) can be appropriately obtained.

If the second mode has been set, the maximum value $Z_{max}$ of the focal values (Z1, Z2, Z3, Z4) is calculated as the optimum focal position ($Z_{AV}$). If the third mode has been set, the minimum value $Z_{min}$ of the focal values (Z1, Z2, Z3, Z4) is calculated as the optimum focal position ($Z_{AV}$).

Figure 5:
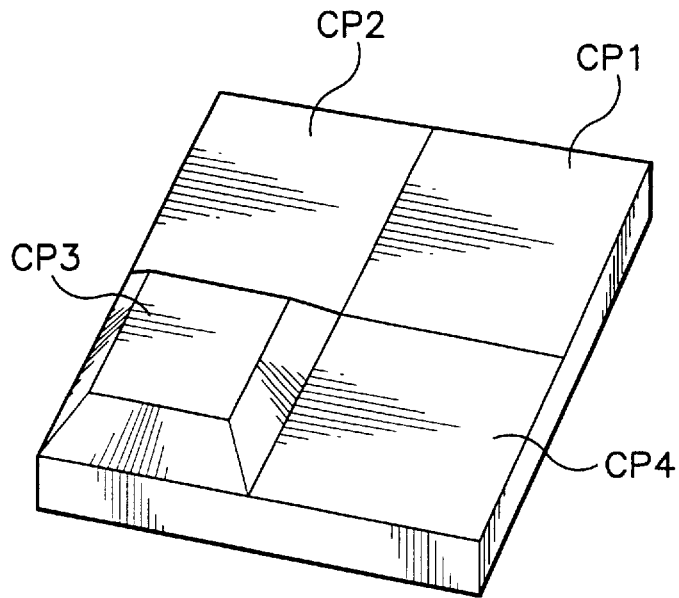
FIG. 5 is a perspective view of a part of a special wafer, in which an IC is mounted on a single chip of the one-shot-four-chip area.
Figure 6:
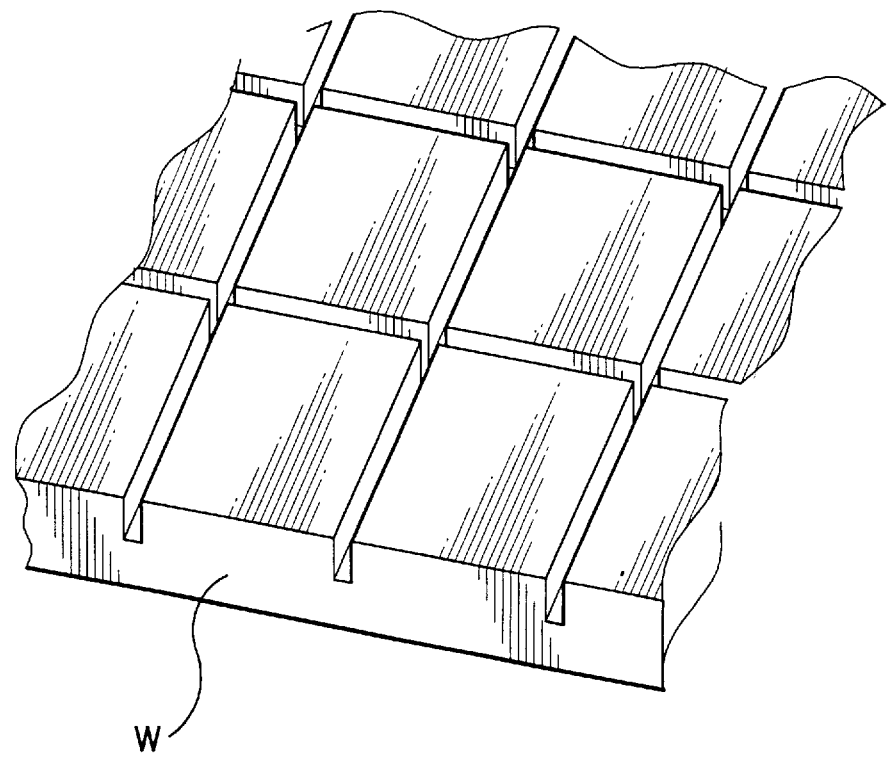
FIG. 6 is a perspective view of the wafer in which scribe lines (with a predetermined width) are formed for separating the chips.

The second mode is suitable to one-shot-four-chip exposure for a special wafer shown in FIG. 5, in which, for example, an IC is mounted only on the chip CP3. The second mode is used to detect the optimum focal position of the chip CP3, while the third mode is used to detect the optimum focal positions of the rest of the chips (other than CP3).

If the fourth mode has been selected as the calculation mode, the master controller 44 calculates the average of the maximum and minimum values (($Z_{max}$+$Z_{min}$)/2) as the optimum focal position ($Z_{AV}$). In the fourth mode, the average height of the highest chip CP3 and the lowest chip (one of CP1, CP2 and CP4) is detected in the example of FIG. 5. This method is different from the least square approximation method, in which three or more focal values are statistically processed through known least square approximation to obtain an approximate plane. The fourth mode calculates the average height neglecting the inclination.

The operator can set one of the four modes through the input unit 96, such as a console, depending on the process to perform optimum focal measurement for each type of product.

It is important to calibrate subtle variations in the sensitivity among the photosensors, or in the gain or offset among the signal processing units, using a reference surface, such as a reference mark plate 77. The calibration result is preferably stored in the memory (not shown) of the master controller 44 to correct the variation according to the selected photosensors and output destination. Generally, calibration is performed when the apparatus is assembled; however, it may be performed between exposures.

Detection of the exposure surface inclination in the exposure apparatus 10 will be explained. The master controller 44 calculates the center positions (C1, C2, C3, C4) of the first through fourth quadrants, based on the two-dimensional positions (X, Y coordinates) of the slit images.

Assuming the center of the exposure area Ef (i.e., the coordinates of slit image $S_{44}$) is the origin, the coordinates (21, 21) of slit image $S_{26}$ are detected as the center C1 of the first quadrant, the coordinates (−21, 21) of slit image $S_{22}$ are detected as the center C2 of the second quadrant, the coordinates (−21, −21) of slit image $S_{62}$ are detected as the center C3 of the third quadrant, and the coordinates (21, −21) of slit image $S_{22}$ are detected as the center C4 of the fourth quadrant. If the center of a quadrant cannot be determined by the coordinates of a single slit image, then the center position of that quadrant is calculated from the coordinates of all of the slit images in that quadrant.

The master controller 44 the calculates the distances l1 (l1=|C1−C2|), l2 (l2=|C2−C3|), l3 (l3=|C3−C4|), and l4 (l4=|C4−C1|) between the adjacent quadrants, based on the centers (C1, C2, C3, C4) of the respective quadrants.

Since the master controller has already calculated the focal values Z1, Z2, Z3, and Z4 of the respective quadrants based on the position data supplied from the signal processor 91, a leveling amount expressed by a pitching amount P and a rolling amount R is calculated from the focal values (Z1, Z2, Z3, Z4) of the first through fourth quadrants and the distances l1, l2, l3 and l4, according to the following formulae:

$$P=[\{(Z1-Z4)/l4\}+\{(Z2-Z3)/l2\}]/2,$$

$$R=[\{(Z1-Z2)/l1\}+\{(Z4-Z3)/l3\}]/2 \quad (2)$$

After the optimum focal position is obtained according to the preset mode and a leveling amount is calculated, the master controller 44 adjusts the Z position (along the optical axis) and inclination of the substrate table 18 based on the calculation result, thereby bringing the surface position of the wafer W into the correct position. The surface position is preferably adjusted through feedback control, while monitoring the outputs from the photosensors. Because the output level of each sensor when the surface position becomes optimum (normally, in alignment with the image plane of the projection lens system) is known, it is not necessary to use all of the photosensors used for surface position detection for the focusing operation (making the exposure surface align with the image plane). Focusing can be performed with the output from at least three photosensors.

Inclination of the wafer surface may be adjusted by detecting a pivotal angle about two axes crossing each other in the water surface. Calculation of the pitching amount P and rolling amount R is therefore not limited to the method described above.

For example, the master controller 44 first calculates the center positions (C1, C2, C3, C4) of the first through fourth quadrants based on the positions of the slit images on the respective quadrants, and then determines a pitching distance lP and a rolling distance lR defined by formula (3), based on the center positions (C1, C2, C3, C4).

$$lP=|C1-C3|$$

$$lR=|C2-C4| \quad (3)$$

The leveling amount (P, R) may be calculated according to formula (4) using the pitching distance lP, the rolling distance lR, and the focal values (Z1, Z2, Z3, Z4) of the first through fourth quadrants.

$$P=(Z1-Z3)/lP$$

$$R=(Z2-Z4)/lR \quad (4)$$

Figure 7:
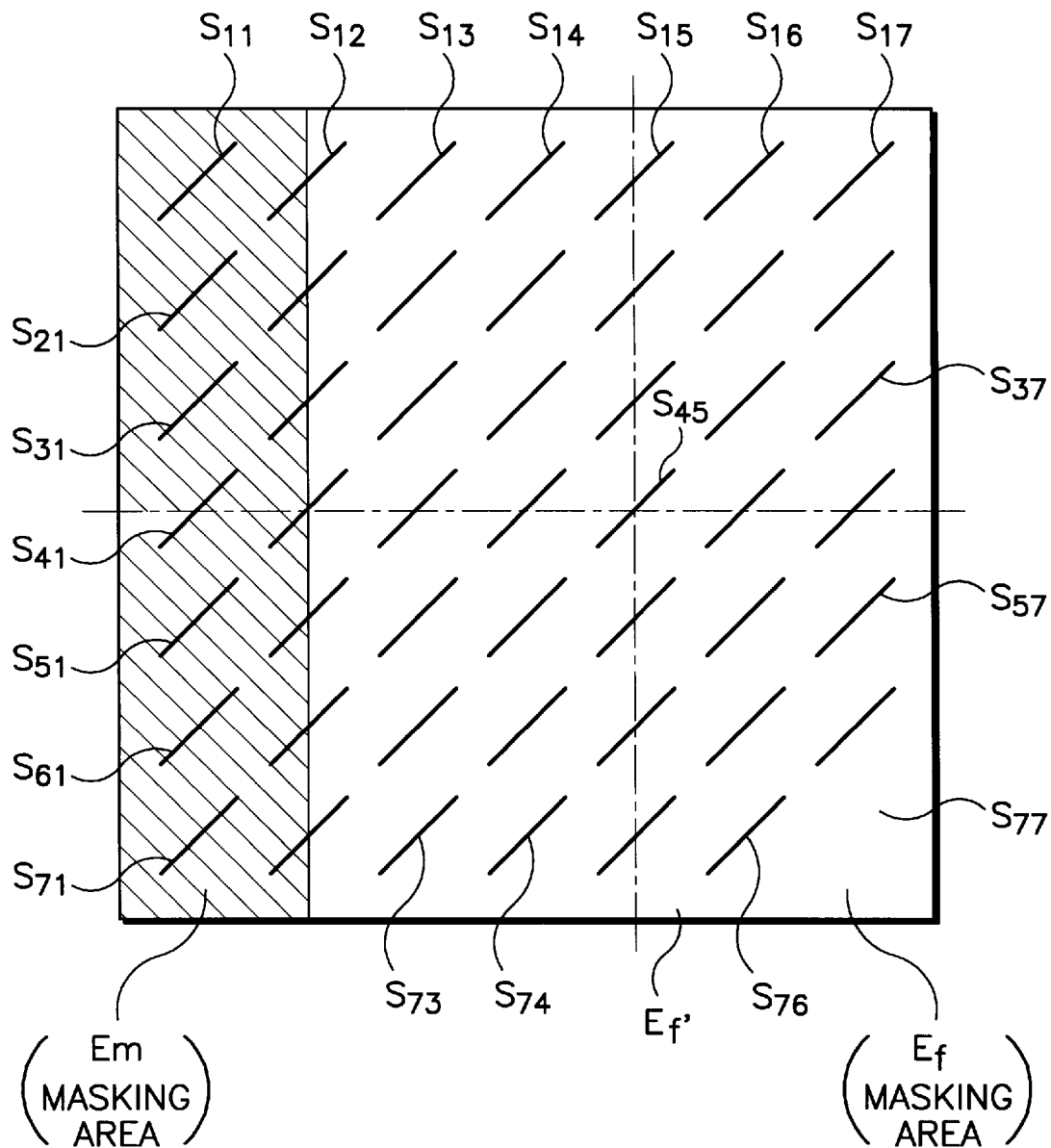
FIG. 7 illustrates the photosensor arrangement when a part of the projection area is masked and the actual projection area has changed.

Referring to FIG. 7, an example will be described in which a part of the exposure area Ef is masked by, for example, movable blinds 45A and 45B in the illumination optical system.

Upon receiving masking information (e.g., blind information) from the main computer, the master controller 44 controls the blind driving mechanism 43A and 43B to drive the movable blinds 45A and 45B. At the same time, the master controller 44 calculates the actually exposed area Ef' (FIG. 7), and selects photosensors D corresponding to the slit images located within the actually exposed area Ef' based on the calculation result. Then, the actually exposed area Ef' is divided into, for example, four quadrants to detect a focal position and a leveling amount.

In FIG. 7, the first quadrant includes slit images $S_{16}$, $S_{26}$, $S_{36}$, $S_{17}$, $S_{27}$, and $S_{37}$, the second quadrant includes slit images $S_{13}$, $S_{23}$, $S_{33}$, $S_{14}$, $S_{24}$, and $S_{34}$, the third quadrant includes slit images $S_{53}$, $S_{63}$, $S_{73}$, $S_{54}$, $S_{64}$, and $S_{74}$, and the fourth quadrant includes slit images $S_{56}$, $S_{66}$, $S_{65}$, $S_{57}$, $S_{67}$, and $S_{77}$.

The master controller 44 inputs data 1 and data 2 to the line L1 and L2 of the register unit RS, respectively, such that photosensors $D_{16}$, $D_{26}$, $D_{36}$, $D_{17}$, $D_{27}$, and $D_{37}$ are connected to the output line $O_1$, photosensors $D_{13}$, $D_{23}$, $D_{33}$, $D_{14}$, $D_{24}$, $D_{34}$ are connected to the output line $O_2$, photosensors $D_{53}$, $D_{63}$, $D_{73}$, $D_{54}$, $D_{64}$, $D_{74}$ are connected to the output line $O_3$, photosensors $S_{56}$, $S_{66}$, $S_{65}$, $S_{57}$, $S_{67}$, $S_{77}$ are connected to the output line $O_4$, and the other photosensors are turned off.

Based on the input data 1 and 2, the switches SA and the opening/closing switches SB are set to the initial state. As a result, a composite signal of the photosensors $D_{16}$, $D_{26}$, $D_{36}$, $D_{17}$, $D_{27}$, $D_{37}$, having received the luminous flux of the slit images reflected from the first quadrant, is supplied to the signal processing unit $94_1$ through the output line $O_1$. The signal processing unit $94_1$ outputs a focal position signal as a detection signal of the first quadrant, which represents the composite position of the slit images $S_{16}$, $S_{26}$, $S_{36}$, $S_{17}$, $S_{27}$, $S_{37}$. Similarly, a composite signal of the photosensors $D_{13}$, $D_{23}$, $D_{33}$, $D_{14}$, $D_{24}$, $D_{34}$, having received the luminous flux of the slit images reflected from the second quadrant, is supplied to the signal processing unit $94_2$ through the output line $O_2$. The signal processing unit $94_2$ outputs a focal position signal as a detection signal of the second quadrant, which represents the composite position of the slit images $S_{13}$, $S_{23}$, $S_{33}$, $S_{14}$, $S_{24}$, $S_{34}$. A composite signal of the photosensors $D_{53}$, $D_{63}$, $D_{73}$, $D_{54}$, $D_{64}$, $D_{74}$, having received the luminous flux of the slit images reflected from the third quadrant, is supplied to the signal processing unit $94_3$ through the output line $O_3$. The signal processing unit $94_3$ outputs a focal position signal as a detection signal of the third quadrant, which represents the composite position of the slit images $S_{53}$, $S_{63}$, $S_{73}$, $S_{54}$, $S_{64}$, $S_{74}$. A composite signal of the photosensors $D_{56}$, $D_{66}$, $D_{76}$, $D_{57}$, $D_{67}$, $D_{77}$, having received the luminous flux of the slit images reflected from the fourth quadrant, is supplied to the signal processing unit $94_4$ through the output line $O_4$. The signal processing unit $94_4$ outputs a focal position signal as a detection signal of the fourth quadrant, which represents the composite position of the slit images $S_{53}$, $S_{63}$, $S_{73}$, $S_{54}$, $S_{64}$, $S_{74}$.

The output circuit 95 digitizes the focal position signals from the signal processing units $94_1$–$94_4$, and supplies serial digital detection data to the master controller 44. The master controller 44 calculates the focal values Z1, Z2, Z3, and Z4 of the first through fourth quadrants, respectively, based on the digital detection data supplied in series from the output circuit 95. The master controller 44 calculates the optimum focal position based on Z1, Z2, Z3, and Z4 using one of the first through fourth modes. The master controller 44 further calculates a leveling amount. Based on the obtained optimum focal position and leveling amount, the surface position of the wafer W is adjusted by moving the substrate table 18 in the Z direction and adjusting the inclination of the substrate table 18 with the driving unit 21.

Because a plurality of slit images are formed at a regular interval over the entire exposure area Ef, a given area can be divided into four quadrants for focal position detection. Even if the actually exposed area Ef' changes, the focal position information can be obtained for each quadrant of the changed exposure area. The optimum focal position and a leveling amount can be obtained for a given exposure area, thereby precisely adjusting the surface position of the wafer for accurate surface alignment.

When a test pattern (TG pattern) is formed on a part of the wafer surface for inspection, the exposure area must be changed through masking for several exposure shots. The surface position detecting method of this example is especially suitable to such a case. On actual exposure area can be divided into appropriate quadrants responding to a change in the exposure area, and the optimum focal position and a leveling amount can be calculated based on the changed exposure area. Although the example recites a case in which the exposure area changes through masking, the surface position detecting method can also accommodate a change in the reticle pattern size and chip size of the wafer. The master controller 44 defines a detection target area based on change information, divides the area into four quadrants, and supplies output of the photosensors, which correspond to the new quadrants, to the respective signal processing units.

In the foregoing description, the actual exposure area is divided into four quadrants, and the destination of output signals from the photosensors D is designated through the sensor selection circuit 93. However, output of the forty nine (49) photosensors $D_{11}$–$D_{77}$ may be separately connected to one of the signal processing units $94_1$–$94_n$ (n=49 in this case). An example in which the switches of the sensor selection circuit 93 are set so that the destination of output from each photosensor is separately fixed to the corresponding signal processing unit will be explained below.

Figure 8:
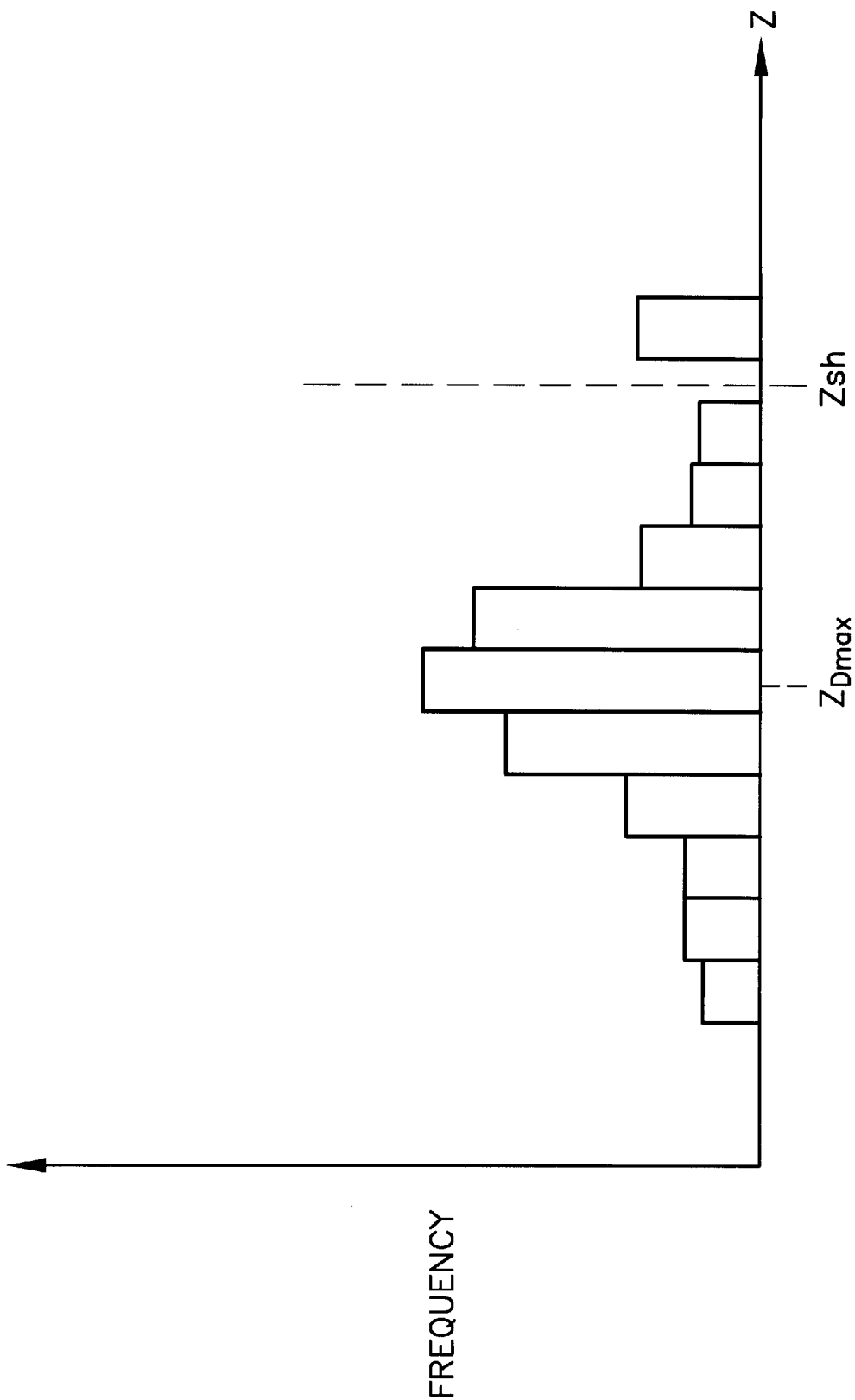
FIG. 8 is an example of the frequency distribution created from the level difference information of the wafer surface.

The signal processing units $94_1$–$94_{49}$ detect the Z positions ZS1, ZS2, ZS3, ..., ZS49 of the slit images S based on the photoelectric signals from photosensors $D_{11}$–$D_{77}$ and supply the Z position data in series to the master controller 44 through the output lines $O_1$–$O_{49}$. The master controller 44 uses the data ZS1, ZS2, ZS3, ..., ZS49 to calculate the average inclination (leveling amount) and an approximate plane of the exposure area Ef through a statistic process, such as the least square approximation. The master controller 44 then calculates a difference between the approximate plane and each of the position data ZS1, ZS2, ZS3, ..., ZS49. The calculation result becomes level difference data. Based on the level difference data, a frequency distribution is created at a constant interval (e.g., 0.1 μm) as shown in FIG. 8. The maximum value $ZD_{max}$ of the frequency distribution is selected as the focal plane (the optimum focal position), because the maximum frequency indicates the most stable area in the wafer surface.

The master controller 44 adjusts, through the driving unit 21, the Z position and inclination of the substrate table 18 based on the calculated optimum focal position and leveling amount, thereby correcting the surface position of the wafer W.

A threshold value Zsh can be set with respect to $ZD_{max}$. If there is a level difference exceeding the threshold value Zsh, the master controller 44 regards it as dust, and informs the operator of the existence of dust through a warning unit or display (not shown). The threshold value Zsh may be set with respect to the average $Z_{AVa}$ of the data ZS1, ZS2, ZS3, ..., ZS49, in place of the maximum $ZD_{max}$, which can achieve the same effect.

In the example described above, the data ZS1, ZS2, ZS3, ... ZS49 from the photosensors $D_{11}$–$D_{77}$ are used to calculate an optimum focal position and a leveling amount (an approximate plane). The master controller 44, however, may define an effective data range in advance and use only those values within the effective range to calculate the optimum focal position and leveling amount. In this instance, output of photosensors that is out of the acceptable range is not used for calculation of the optimum focal position and leveling amount. This method is effective, for example, when scribe lines (fine grooves with a predetermined width) are formed for separating chips on the wafer W, and a photosensor may detect the Z position of the bottom of a scribe line. The optimum focal position and leveling amount are correctly calculated even if the flatness of the wafer is deteriorated by, for example, dust attached to the rear surface of the wafer, because data from the uneven portion is thrown out.

The sensor selection circuit 93 can select some of the output lines $O_1$–$O_n$ to use. For example, if four output lines are selected, and photosensors are successively switched to a desired number (one, two, three, or four) of the selected output lines, then the master controller 44 can calculate the Z positions (ZS1, ZS2, ZS3, . . . ZSn) of the respective slit images on the wafer W in a time-division manner based on the output of the photosensors. Such time-division switching and connection operation requires a high-speed operation device to prevent the throughput from dropping. The time-division switching/connection process is efficiently applied to the calculation of the optimum focal position and the leveling amount based on focal data from the divided exposure areas, as well as to the calculation of the optimum focal position and the leveling amount based on a predetermined range of the position data ZS1, ZS2, ZS3, . . . , ZS49.

In the projection exposure apparatus 10 of the present invention, all the functions of the sensor selection circuit may not be necessarily used to calculate the focal position of each quadrant. The switches of the sensor selection circuit 93 may be fixed so that the output from the photosensors $D_{11}$–$D_{77}$ are separately connected to the signal processing units $94_1$–$94_n$. If this is the case, slit images included in each quadrant and the corresponding photosensors are obtained from the exposure area information, as shown in FIG. 4, and the focal values (Z1, Z2, Z3, Z4) of the respective quadrants are calculated through averaging the output of the photosensors in the respective quadrants. The optimum focal position and the leveling amount are determined based on the focal values (Z1, Z2, Z3, Z4) of the respective quadrants, as has been described above. Output from the photosensors other than those corresponding to the slit images included in the respective quadrants are neglected.

If the output of the photosensors $D_{11}$–$D_{77}$ are fixed to the signal processing units $94_1$–$94_n$, the sensor selection circuit 93 may be omitted. Without the sensor selection circuit, the output from the respective photosensors D is independently demodulated by the corresponding signal processing units 94 in synchronization with a signal of rotational vibration frequency. The master controller 44 calculates the average of the focal signals output from the signal processing units for each destination.

It is understood from the foregoing that, in the projection exposure apparatus 10 of the invention, the operation unit, the first through fourth operation processors, the first and second selection circuits, and the controller are realized by the functions of the master controller 44.

Figure 9A:
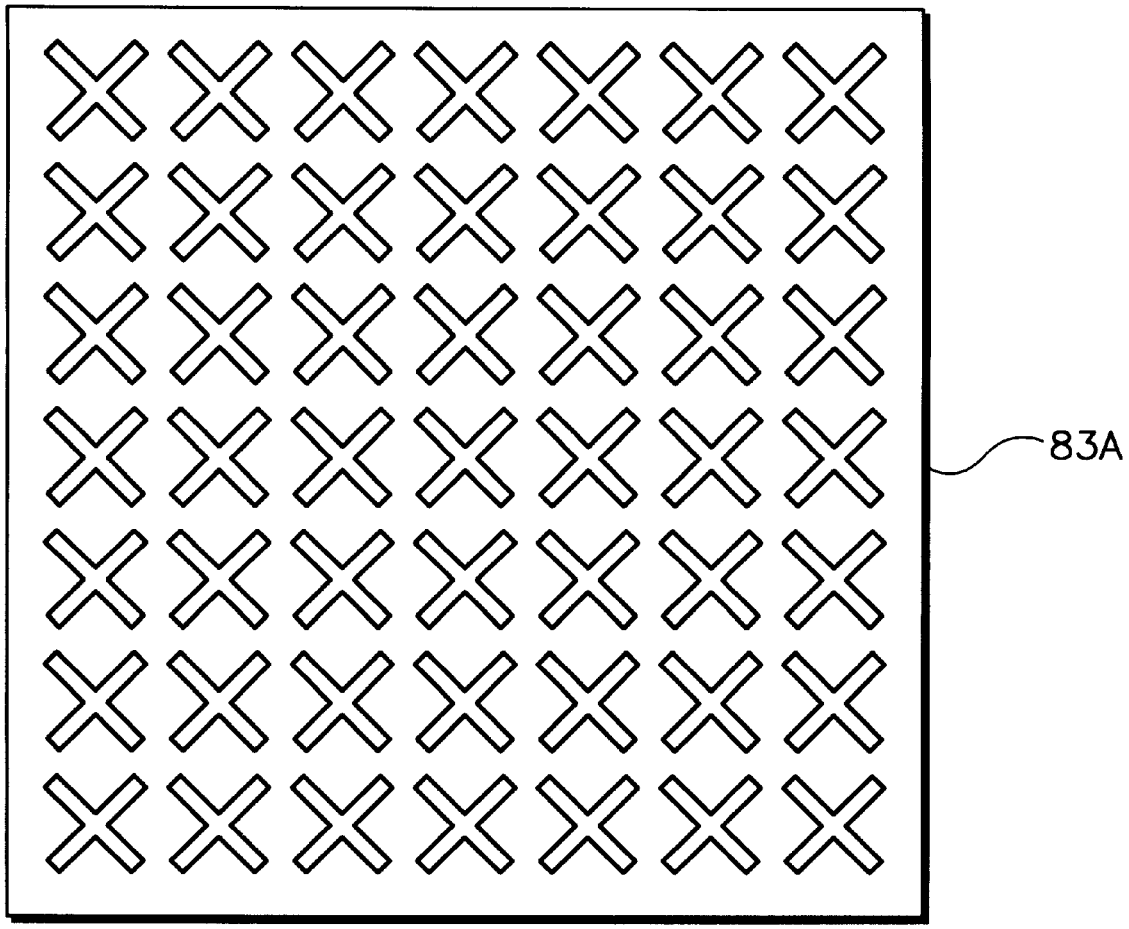
FIGS. 9(A)–(C) show the pattern plate, the projection area and the light-receiving plane, respectively, of an alternative embodiment of the invention.
Figure 9B:
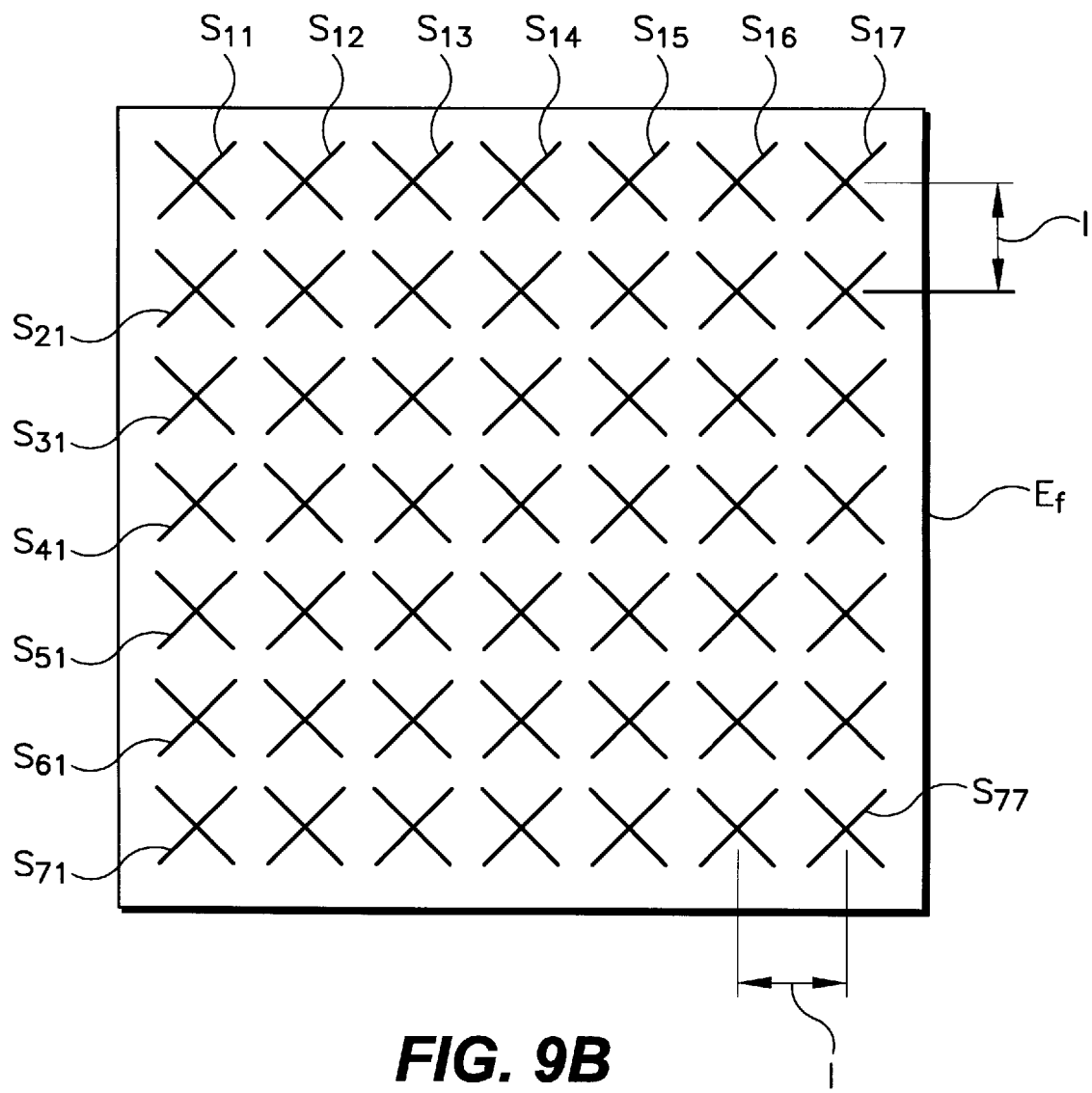
Figure 9C:
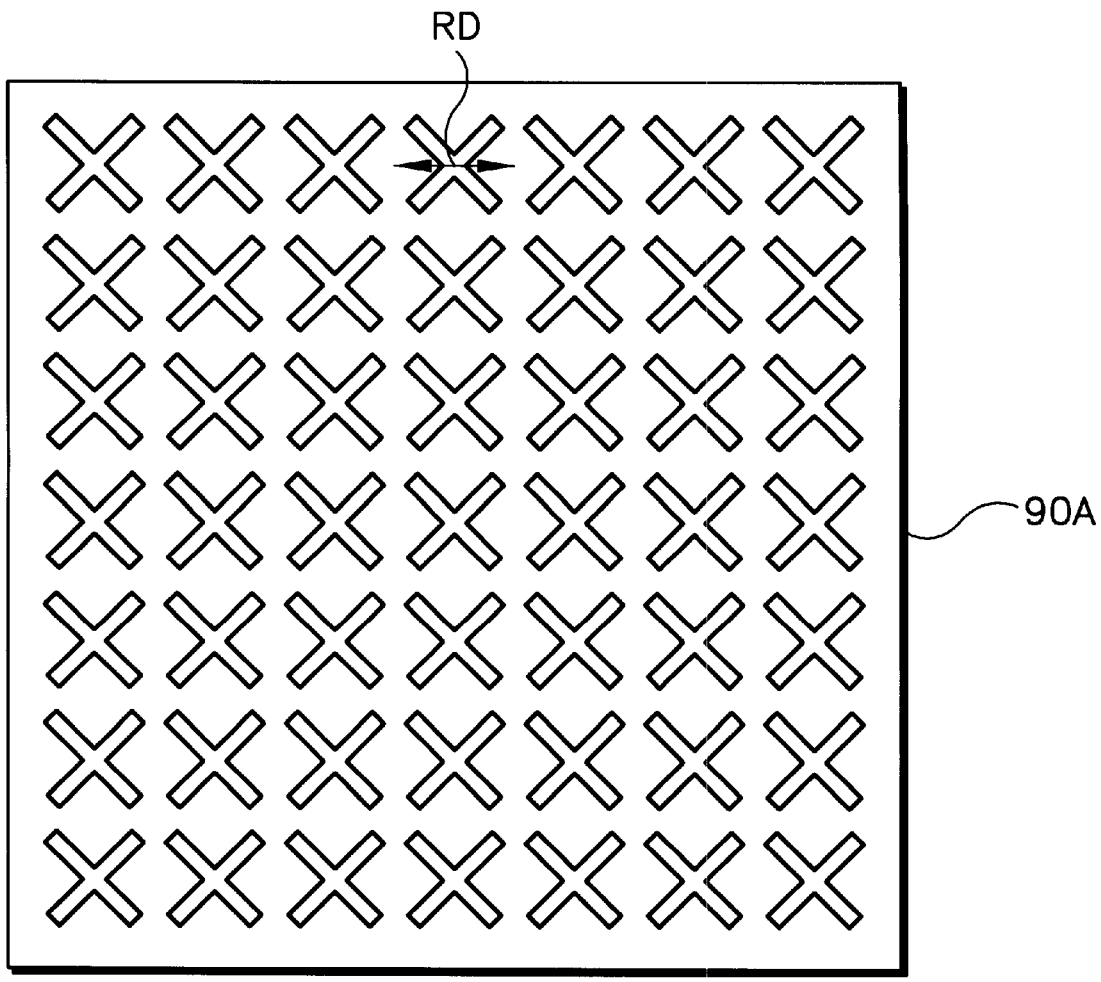

FIG. 9 shows a modification of the pattern plate. In this arrangement, X-shaped apertures are formed in a matrix on the pattern plate 83A, as shown in FIG. 9(A), instead of the slit apertures of the pattern plate 83 of FIG. 2(A). Corresponding X-shaped images $S_{11}$–$S_{77}$ are formed on the exposure area Ef, as shown in FIG. 9(B). A slit plate 90A is positioned in front of the photosensors $D_{11}$–$D_{77}$, which constitute the light-receiving unit 90. The photosensors receive, through the slit plate 90A, luminous flux reflected from the X-shaped images, and convert the luminous flux into a photoelectric signal. The reflected luminous flux is vibrated by the vibration mirror 88 in the direction RD as shown in FIG. 9(C). The photoelectric signal of the X-shaped image is demodulated by the signal processing unit 94 at the vibration frequency of the vibration mirror 88, thereby obtaining the Z position of the X-shaped image formed on the wafer surface. As compared with a simple slit image, the X-shaped image can provide more accurate average positions of the wafer surface.

With the surface position detecting method of the invention, even if there are level differences in the exposure area, the surface position is accurately detected at each point on the exposed object, which is a remarkable improvement over the prior art technique.

The surface position adjusting apparatus of the invention is capable of adjusting the surface position of the exposed object to a desired position relative to the image plane of the projection lens system, even with level differences in the exposed surface of the exposed object.

The projection exposure apparatus of the invention can calculate the optimum focal position and the leveling amount taking into account level differences in the exposure area. The substrate table is precisely driven so that the exposed surface of the photosensitive substrate aligns with the image plane of the projection lens system, based on the calculation result. The mask is also aligned with the photosensitive substrate prior to exposure. The arrangement can achieve highly precise aligning exposure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A surface position detecting method for detecting a surface position of a projection area on a substrate, a pattern being projected onto the projection area as a pattern image through a projection optical system, the method comprising:
   (a) dividing the projection area into four quadrants;
   (b) projecting a plurality of patterns to form at least one image in each quadrant of the projection area;
   (c) receiving luminous flux reflected from the images;
   (d) converting the luminous flux into photoelectric signals;
   (e) calculating respective focal values of the four quadrants along a projection optical system optical axis based on the photoelectric signals; and
   (f) calculating an optimum focal position along the optical axis and a leveling amount based on the focal values.

2. The surface position detecting method of claim 1, wherein step (f) is practiced by calculating an average value of the focal values of the four quadrants.

3. The surface position detecting method of claim 1, wherein step (f) is practiced by determining a maximum value of the focal values of the four quadrants.

4. The surface position detecting method of claim 1, wherein step (f) is practiced by determining a minimum value of the focal values of the four quadrants.

5. The surface position detecting method of claim 1, wherein step (f) is practiced by calculating an average of a maximum value and a minimum value of the focal values of the four quadrants.

6. The surface position detecting method of claim 1, wherein the leveling amount in step (f) is calculated by:
   calculating respective center positions (C1, C2, C3, C4) of the four quadrants based on the image positions in the four quadrants;
   calculating distances l1 (l1=|C1−C2|), l2 (l2=|C2−C3|), l3 (l3=|C3−C4|), and l4 (l4=|C4−C1|) between adjacent quadrants based on the center positions (C1, C2, C3, C4) of the four quadrants; and
   calculating the leveling amount based on the distances between the adjacent quadrants and the focal values of the four quadrants, the leveling amount (P, R) being expressed as:

$$(P, R)=([\{(Z1-Z4)/l4\}+\{(Z2-Z3)/l2\}]/2, [\{(Z1-Z2)/l1\}+\{(Z4-Z3)/l3\}]/2).$$

7. The surface position detecting method of claim 1, wherein the leveling amount in step (f) is calculated by:

calculating respective center positions (C1, C2, C3, C4) of the four quadrants based on the image positions in the four quadrants;

calculating apitching distance 1P (1P=|C1−C3|) and a rolling distance 1R (1R=|C2−C4|) based on the center positions (C1, C2, C3, C4) of the four quadrants; and calculating the leveling amount based on the pitching distance 1P, the rolling distance 1R, and the focal values of the four quadrants, the leveling amount (P, R) being expressed as:

(P, R)={(Z1−Z3)/1P, (Z2−Z4)/1R)}.

8. The surface position detecting method of claim 1, wherein the leveling amount in step (f) is calculated by:

detecting Z positions of the images formed on the substrate as position data in the optical-axis direction based on the photoelectric signals;

calculating an approximate plane by statistically processing the position data through least square approximation; and calculating the leveling amount based on the inclination of the approximate plane.

9. The surface position detecting method of claim 1, wherein step (f) is practiced by:

detecting vertical positions of the images formed on the substrate as position data in the optical-axis direction based on the photoelectric signals; and using a predetermined range of the position data to calculate the optimum focal position and the leveling amount.

10. The surface position detecting method of claim 1, wherein the optimum focal position is determined by:

receiving luminous flux of the images reflected by the substrate;

converting the luminous flux into photoelectric signals;

detecting the Z positions (ZS1, ZS2, ZS3, . . . , ZSm) of the images on the substrate as position data in the optical axis direction based on the photoelectric signals;

calculating an approximate plane by statistically processing the position data through least square approximation;

calculating a level difference between the approximate plane and the Z position of each of the images to obtain the frequency distribution of the level differences; and determining the most frequent level position as the optimum focal position.

11. The surface position detecting method of claim 1, wherein step (b) is practiced by projecting the patterns from an oblique direction at a predetermined inclination angle with respect to the optical axis of the projection optical system.

12. The surface position detecting method of claim 1, wherein step (b) is practiced by projecting slit shaped patterns to form at least one slit shaped image in each quadrant of the projection area.

13. The surface position detecting method of claim 1, wherein step (b) is practiced by projecting X-shaped patterns to form at least one X-shaped image in each quadrant of the projection area.

14. A surface position adjusting apparatus for aligning a surface of a substrate with an image plane of a projection optical system, the projection optical system projecting a pattern of a mask onto the surface of the substrate as a pattern image, the surface position adjusting apparatus comprising;

a light-transmitting optical system that projects a plurality of images along at optical path on the substrate;

a light-receiving optical system disposed in said optical path that receives luminous flux reflected from the images on the substrate and converts the luminous flux into photoelectric signals;

a table on which the substrate is mounted;

a driving system coupled with the table that drives the table along the optical axis;

an operation unit communicating with said light-receiving optical system, said operation unit calculating an optimum focal position based on the photoelectric signals; and a controller communicating with said operation unit and said driving system, said controller controlling said driving system based on said optimum focal position, wherein said light-receiving optical system comprises a plurality of photosensors corresponding to the number of images, wherein each sensor corresponds to one of the images, said photosensors generating said photoelectric signals, and comprises a senser selector communicating with said photosensors and said operation unit, said sensor selector selecting the photosensors and outputting each of photoelectric signals generated by the selected photosensors to the operation unit.

15. The surface position adjusting apparatus of claim 14, wherein said pattern is a slit shaped pattern forming a slit shaped pattern image on the projection area.

16. The surface position adjusting apparatus of claim 14, wherein said pattern is an X-shaped pattern forming an X-shaped pattern image on the projection area.

17. The surface position adjusting apparatus of claim 14, wherein said operation unit is operable in accordance with a first function to detect Z positions of the images formed on the substrate as position data in the optical axis direction based on the photoelectric signals, a second function to calculate an approximate plane by statistically processing the position data through least square approximation, a third function to calculate a level difference between the approximate plane and the Z position of each image, and a fourth function to obtain a frequency distribution of the level differences and determine a most frequent level position as the optimum focal position.

18. The surface position adjusting apparatus of claim 17, wherein said operation unit is operable to set a threshold value in the frequency distribution, and is operable in accordance with a dust detecting function to identify a level difference exceeding the threshold value as dust.

19. The surface position adjusting apparatus of claim 14, wherein said light transmitting optical system is disposed offset from the substrate, and wherein said images are projected from an oblique direction at a predetermined inclination angle with respect to the optical axis of the projection optical system.

20. The surface position adjusting apparatus of claim 19, wherein said light-transmitting optical system comprises a mirror disposed in said optical path, said mirror directing said images to the projection area on the substrate.

21. The surface position adjusting apparatus of claim 14, wherein said light-transmitting optical system comprises:

a fiber flux guiding light along said optical path; and a pattern plate disposed in said optical path, said pattern plate having a pattern thereon forming said images.

22. The surface position adjusting apparatus of claim 21, wherein said light-transmitting optical system further comprises a collective lens disposed between said fiber flux and said pattern plate in said optical path and a collimating lens and an illuminating objective lens disposed between said pattern plate and said substrate in said optical path.

23. The surface position adjusting apparatus of claim 22, wherein said light-transmitting optical system further comprises a mirror disposed in said optical path between said pattern plate and said substrate, said mirror directing said images to the projection area on said substrate.

24. The surface position adjusting apparatus of claim 14, wherein said light-receiving optical system comprises a plurality of photosensors corresponding to the number of images, wherein each sensor corresponds to one of the images, said photosensors being disposed in said optical path and communicating with said operation unit.

25. The surface position adjusting apparatus of claim 24, wherein said light-receiving optical system further comprises a sensor selection circuit coupled with said plurality of photosensors, said sensor selection circuit activating ones of said photosensors in accordance with instructions from said controller.

26. The surface position adjusting apparatus of claim 25, wherein said light-receiving optical system further comprises a signal processor coupled via said sensor selection circuit with said plurality of photosensors, said signal processor supplying photoelectric signals from said photosensors to said controller.

27. The surface position adjusting apparatus of claim 24, wherein said light-receiving optical system is disposed offset from the substrate, said light-receiving optical system further comprising a mirror disposed in said optical path downstream from the substrate, said mirror directing said images to said photosensors.

28. The surface position adjusting apparatus of claim 27, wherein said mirror comprises a rotational diaphragm coupled with a vibrator unit communicating with said controller.

29. The surface position adjusting apparatus of claim 27, wherein said light-receiving optical system further comprises a collecting objective lens disposed in said optical path between said substrate and said mirror, and an imagery lens disposed in said optical path between said mirror and said photosensors.

30. The surface position adjusting apparatus of claim 14, wherein a projection area on the substrate is divided into four quadrants, said light-transmitting optical system comprising optical structure that projects at least one of said images in each of said quadrants, wherein said operation unit comprises:
   a first operation processor communicating with said light-transmitting optical system that calculates Z positions of the images on the substrate as position data in the optical-axis direction based on the photoelectric signals;
   a second operation processor communicating with said first operation processor that calculates focal values of the quadrants along the optical axis based on the Z positions of the images;
   a third operation processor communicating with said second operation processor that calculates said optimum focal position along the optical axis based on the focal values; and
   a fourth operation processor communicating with said second operation processor that calculates a leveling amount based on the focal values.

31. The surface position adjusting apparatus of claim 30, wherein said third and fourth operation processors are operable to determine said optimum focal position and said leveling amount using only a prescribed range of the position data.

32. The surface position adjusting apparatus of claim 30, wherein said third operation processor is operable to calculate an average of the focal values as said optimum focal position.

33. The surface position adjusting apparatus of claim 30, wherein said third operation processor is operable to determine a maximum value of the focal values as said optimum focal position.

34. The surface position adjusting apparatus of claim 30, wherein said third operation processor is operable to determine a minimum value of the focal values as said optimum focal position.

35. The surface position adjusting apparatus of claim 30, wherein said third operation processor is operable to calculate the average of a maximum value and a minimum value of the focal values as the optimum focal position.

36. The surface position adjusting apparatus of claim 30, wherein said third operation processor is operable in a first mode for calculating an average of the focal values as the optimum focal position, a second mode for calculating a maximum value of the focal values as the optimum focal position, a third mode for calculating a minimum value of the focal values as the optimum focal position, and a fourth mode for calculating an average of the maximum value and the minimum value as the optimum focal position, the apparatus further comprising a selector coupled with said third operation processor, said selector enabling selective setting of one of said first through fourth modes.

37. The surface position adjusting apparatus of claim 30, wherein said fourth operation processor is operable in accordance with a first function to calculate center positions (C1, C2, C3, C4) of the quadrants based on the positions of the images formed in the quadrants, a second function to calculate distances l1 (l1=|C1−C2|), l2 (l2=|C2−C3|), l3 (l3=|C3−C4|), and l4 (l4=|C4−C1|) between adjacent quadrants based on the center positions (C1, C2, C3, C4), and a third function to calculate said leveling amount based on the distances between adjacent quadrants and the focal values, said leveling amount (P, R) being expressed as:

$$(P, R)=([\{(Z1-Z4)/l4\}+\{(Z2-Z3)/l2\}]/2, [\{(Z1-Z2)/l1\}+\{(Z4-Z3)/l3\}]/2).$$

38. The surface position adjusting apparatus of claim 30, wherein said fourth operation processor is operable in accordance with a first function to calculate center positions (C1, C2, C3, C4) of the quadrants based on the positions of the images formed in the quadrants, a second function to determine a pitching distance lP (lP=|C1−C3|) and a rolling distance lR (lR=|C2−C4|) based on the center positions (C1, C2, C3, C4), and a third function to calculate said leveling amount (P, R)={(Z1−Z3)/lP, (Z2−Z4)/lR)} based on the pitching distance lP, the rolling distance lR, and the focal values.

39. The surface position adjusting apparatus of claim 30, wherein the sensor selector is operable to connect the photosensors corresponding to the quadrants to a calculating unit in the operation unit.

40. A projection exposure apparatus for transferring a pattern formed on a mask through a projection optical system onto a substrate as a pattern image, the projection exposure apparatus comprising:
   a light-tramsmitting optical system that projects a plurality of slit images along an optical path within a projection area on the substrate;

a light-receiving optical system disposed in said optical path that receives luminous flux reflected from the slit images on the substrate and converts the luminous flux into photoelectric signals;

a substrate table on which the substrate is mounted;

a driving system coupled with the substrate table that drives the substrate table along the optical axis;

an operation unit communicating with said light-receiving optical system, said operation unit calculating an optimum focal position along the optical axis based on the photoelectric signals; and a controller communicating with said operation unit and said driving system, said controller controlling said driving system based on said optimum focal position, wherein said light-receiving optical system comprises a plurality of photosensors corresponding to the number of slit images, wherein each sensor corresponds to one of the slit images, said photosensors generating said photoelectric signals, and comprises a sensor selector communicating with said photosensors and said operation unit, said sensor selector selecting the photosensors and outputting each of photoelectric signals generated by the selected photosensors to the operation unit.

41. The projection exposure apparatus of claim 40, wherein said light-receiving optical system comprises a plurality of photosensors corresponding to the number of slit images wherein each sensor corresponds to one of the slit images, said photosensors generating said photoelectric signals, and wherein the surface position adjusting apparatus further comprises at least four output circuits connected to said operation unit and outputting said photoelectric signals generated by said photosensors, and a sensor selection and connection circuit communicating with said photosensors and said output circuits, said sensor selection and connection circuit selecting the photosensors and connecting each of the selected photosensors to a respective one of the output circuits.

42. The projection exposure apparatus of claim 40, wherein said sensor selector selects slit images that are to be detected as target slit images according to a size of the pattern area on the mask or a chip size on the substrate.

43. The projection exposure apparatus of claim 40, further comprising blinds that define an exposure area on the substrate, wherein said sensor selector selects the slit images positioned within the exposure area as detection targets.

44. A projection exposure apparatus for transferring a pattern formed on a mask through a projection optical system onto a substrate by means of exposure light from a light source, the projection exposure apparatus comprising:

a detecting system that has a plurality of detection points on the substrate to detect positional information of the substrate in a direction of the optical axis of the projection optical system;

a changeable member, disposed between the light source and the mask, that changes an area illummated by the exposure light on the substrate;

a selector, connected to the detecting system and the changeable member, that selects at least one of detection points among the plurality of detection points according to information regarding the changeable member; and a surface position adjusting member, connected to the selector, that adjusts a surface position of the substrate according to said positional information of the detection points selected by the selector.

45. A projection exposure apparatus according to claim 44, wherein said selector calculates actual exposure area defined by the changeable member as said information regarding the changeable member, and selects the detection points according to the actual exposure area.

46. A projection exposure apparatus according to claim 44, wherein:

said detecting system comprises a light-transmitting optical system that projects a plurality of images at the detection points on the substrate, and a light-receiving optical system that receives the luminous flux reflected from the images on the substrate and converts the luminous flux into photoelectric signals; and said selector selects photoelectric signals corresponding to the images located within an area illuminated by the exposure light on the substrate.

47. A projection exposure apparatus according to claim 44, wherein:

said substrate is movable in an X direction and a Y direction perpendicular to the X direction with a reference plane perpendicular to the optical axis of the projection optical system; and said detection system transmits a plurality of slit images at the detection points on the substrate, wherein the slit images incline with respect to the X direction and Y direction.

48. A projection exposure apparatus according to claim 44, wherein:

said selector divides the area illuminated by the exposure light on the substrate into a plurality of divided areas, and calculates surface position of each divided area according to said positional information of the detection points selected by the selector; and said surface position adjusting member adjusts a surface position of the substrate according to said surface position of each divided area.

49. A projection exposure apparatus according to claim 44, wherein said selector obtains level difference information of the substrate based on the positional information of the detection points selected by the selector.

50. A projection exposure apparatus according to claim 44, wherein the changeable member is arranged in a plane conjugate with a pattern of the mask.

51. A projection exposure apparatus according to claim 50, wherein said changeable member comprises a movable member, disposed in the optical path of the exposure light, that changes position in the optical path, and a driving member driving the movable member.

52. A projection exposure apparatus according to claim 51, wherein said driving member moves the movable member between a first position and a second position to change the area illuminated by the exposure light on the substrate.

53. A projection exposure apparatus according to claim 51, wherein said movable member comprises a blind member masking at least a part of the exposure light.

54. A projection exposure apparatus according to claim 44, further comprising an optical member disposed between the light source and the mask, wherein the area illuminated by the exposure light is defined by the changeable member and the optical member.

55. A projection exposure apparatus according to claim 54, wherein the optical member is apart from the changeable member in a direction along an optical path of the exposure light.

56. A projection exposure apparatus according to claim 54, wherein the changeable member is arranged in a plane conjugate with a pattern of the mask.

57. A projection exposure apparatus according to claim 54, wherein the optical member is fixed, and wherein the changeable member includes a movable member that moves relative to the optical member.

58. A projection exposure apparatus according to claim 57, wherein the moveable member is disposed in a plane conjugate with a patten of the mask, and wherein the optical member is apart from the movable member in a direction along an optical path of the exposure light.

59. A projection exposure apparatus according to claim 44, wherein said selector selects at least one of detection points located within an area illuminated by the exposure light on the substrate.

60. A projection exposure apparatus according to claim 59, wherein:

said selector comprises a main control system; and said main control system controls the changeable member and the selection of the detection points.

61. A projection exposure apparatus according to claim 60, wherein:

said changeable member comprises a blind member masking the exposure light; and said main control system controls the changeable member according to masking information of the blind member.

62. A projection exposure apparatus according to claim 60, wherein said main control system calculates an optimum focal position of the substrate according to the positonal information of the detection points selected by the selector.

63. A projection exposure apparatus according to claim 62, wherein said surface position adjusting member adjusts focal position of the substrate according to the optimum focal position.

64. A projection exposure apparatus according to claim 60, wherein said main control system calculates a leveling amount of the substrate surface according to the positional information of the detection points selected by the selector.

65. A projection exposure apparatus according to claim 64, wherein said surface position adjusting member adjusts an inclination of the substrate surface according to the leveling amount.

66. A projection exposure apparatus according to claim 64, wherein said leveling amount comprises a pitching amount and a rolling amount of the substrate surface.

67. A projection exposure method for transferring a pattern formed on a mask through a projection optical system onto a substrate by means of an exposure light, the projection exposure method comprising:

selecting at least one of detection points among a plurality of detection points according to information regarding a changeable member that changes an area illuminated by the exposure light on the substrate, wherein the plurality of detection points effects detection of positional information of the substrate in a direction of the optical axis of the projection optical system; and adjusting a surface position of the substrate according to said positional information of the detection points selected in said selecting step.

68. A projection exposure method according to claim 67, wherein said detecting step comprises:

projecting a plurality of images at the detection points on the substrate;

receiving the luminous flux reflected from the images on the substrate and converting the luminous flux into photoelectric signals; and selecting photoelectric signals corresponding to the images located within an area illuminated by the exposure light on the substrate.

69. A projection exposure method according to claim 67, further comprising dividing the area illuminated by the exposure light on the substrate into four quadrants, and calculating surface position of each quadrant according to said positional information of the detection points selected in the selecting step.

70. A projection exposure method according to claim 67, wherein said selecting step comprises calculating and exposure area defined by the changeable member as said information regarding the changeable member, and selecting the detection points according to the actual exposure area.

71. A projection exposure method according to claim 67, wherein said substrate is movable in the X direction and Y direction perpendicular to the X direction within a reference plane perpendicular to the optical axis of the projection optical system, wherein said detecting step comprises transmitting a plurality of slit images at the detection points on the substrate, and wherein the slit image inclines with respect to the X direction and Y direction.

72. A projection exposure method according to claim 67, wherein said selecting step comprises dividing the area illuminated by the exposure light on the substrate into a plurality of divided areas, and calculating surface position of each divided area according to said positonal information of the selected detection points, and wherein said adjusting step adjusts a surface position of the substrate according to said surface position of each divided area.

73. A projection exposure method according to claim 67, further comprising obtaining level difference information of the substrate based on the positional information of the selected detection points.

74. A projection exposure method according to claim 67, wherein said detection points are formed at a regular interval over the entire area illuminated by the exposure light on the substrate.

75. A projection exposure method according to claim 67, wherein said information regarding the changeable member comprises information regarding a pattern size of the mask.

76. A projection exposure method according to claim 67, wherein said information regarding the changeable member comprises information regarding a chip size of the substrate.

77. A projection exposure method according to clam 67, wherein said selecting step comprises selecting at least one of detection points located within an area illuminated by the exposure light on the substrate.

78. A projection exposure method according to claim 77, wherein said changeable member comprises a blind member masking the exposure light, and wherein said selecting step comprises controlling the changeable member according to masking information of the blind member.

79. A projection exposure method according to claim 67, further comprising calculating an optimum focal position of the substitute according to the positional information of the detection points selected in the selecting step.

80. A projection exposure method according to claim 79, wherein said adjusting step comprises adjusting focal position of the substrate according to the optimum focal position.

81. A projection exposure method according to claim 67, further comprising calculating a leveling amount of the substrate surface according to the positional information of the detection points selected in the selecting step.

82. A projection exposure method according to claim 81, wherein said adjusting step comprises adjusting an inclination of the substrate surface according to the leveling amount.

83. A projection exposure method according to claim 82, wherein said leveling amount comprises a pitching amount and a rolling amount of the substrate surface.

84. A projection exposure method according to claim 67, wherein the chargeable member is arranged in a plane conjugate with a pattern of the mask.

85. A projection exposure method according to claim 84, wherein said changeable member comprises a movable member, disposed in the optical path of the exposure light that changes position in the path, and wherein said selecting step comprises driving the movable member.

86. A projection exposure apparatus according to claim 84, wherein the movable member is movable between a first position and a second position to change the area illuminated by the exposure light on the substrate.

87. A projection exposure method according to claim 85, wherein said movable member comprises a blind member masking at least a part of the exposure light.

88. A projection exposure method according to claim 67, wherein the area illuminated by the exposure light is defined by the changeable member and the optical member which is disposed between the light source and the mask.

89. A projection exposure method according to claim 88, wherein the optical member is apart from the changeable member in a direction along an optical path of the exposure light.

90. A projection exposure method according to claim 88, wherein the changeable member is arranged in a plane conjugate with a pattern of the mask.

91. A projection exposure method according to clam 88, wherein the optical member is fixed, and wherein the changeable member includes a movable member which moves relative to the optical member.

92. A projection exposure method according to claim 91, wherein the movable member is disposed in a plane conjugate with a pattern of the mask, and wherein the optical member is apart from the movable member in a direction along an optical path of the exposure light.

93. A projection exposure method according to claim 92, wherein the optical member is a field stop with a rectangular aperture, and wherein the movable member defines the vertical length of the rectangular aperture.

94. A projection exposure method according to claim 92, wherein said selecting step comprises selecting at least one of detection points located within an area illuminated by the exposure light on the substrate.

95. A projection exposure method according to claim 94, wherein said changeable member comprises a blind member masking the exposure light, and wherein said selecting step comprises controlling the changeable member according to masking information of the blind member.

96. A projection exposure method according to claim 95, further comprising calculating an optimum focal position of the substrate according to the positional information of the detection points selected in the selecting step.

97. A projection exposure method according to claim 95, further comprising calculating a leveling amount of the substrate surface according to the positional information of the detection points selected in the selecting step.

98. A method for making a projection exposure apparatus for transferring a pattern formed on a mask through a projection optical system onto a substrate by means of an exposure light from a light source, the method comprising:

providing a detecting system that has a plurality of detection points on the substrate to detect positional information of the substrate in a direction of the optical axis of the projection optical system;

providing a changeable member, disposed between the light source and the mask, that changes an area illuminated by the exposure light on the substrate;

providing a selector, connected to the detecting system and the movable member, that selects at least one of detection points among the plurality of detection points according to information regarding the movable member; and providing a surface position adjusting member, connected to the selector, that adjusts a surface position of the substrate according to said positional information of the detection points selected by the selector.

99. A method for making a projection exposure apparatus according to claim 98, wherein said selector calculates an actual exposure area defined by the changeable member as said information regarding the changeable member, and selects the detection points according to the actual exposure area.

100. A method for making a projection exposure apparatus according to claim 98, wherein:

said detecting system comprises a light-transmitting optical system that projects a plurality of images at the detection points on the substrate, and a light-receiving optical system that receives the limits flux reflected from the images on the substrate and converts the luminous flex into photoelectric signals; and said selector selects photoelectric signals corresponding to the images located within a area illuminated by the exposure light on the substrate.

101. A method for making a projection exposure apparatus according to claim 98, wherein:

said substrate is movable in an X direction and a Y direction perpendicular to the X direction within a reference plane perpendicular to the optical axis of the projection optical system; and said detection system transmits a plurality of slit images at the detection points on the substrate, wherein the slit images incline with respect to the X direction and Y direction.

102. A method for making a projection exposure apparatus according to claim 98, wherein:

said selector divides the area illuminated by the exposure light on the substrate into four quadrants and calculates surface position of each quadrant according to said positional information of the detection points selected by the selector; and said surface position adjusting member adjusts a surface position of the substrate according to said surface position of each quadrant.

103. A method for making a projection exposure apparatus according to claim 98, wherein said selector obtains level difference information of the substrate based on the positional information of the detection points selected by the selector.

104. A method for making a projection exposure apparatus according to claim 98, wherein the changeable member is arranged in a plane conjugate with a pattern of the mask.

105. A method for making a projection exposure apparatus according to claim 104, wherein said changeable member comprises a movable member, disposed in the optical path of the exposure light, that changes position in the optical path, and a driving member driving the movable member.

106. A method for making a projection exposure apparatus according to claim 105, wherein said driving member moves the movable member between a first position and a second position to change the area illuminated by the exposure light on the substrate.

107. A method for making a projection exposure apparatus according to claim 105, wherein said movable member comprises a blind member masking at least a part of the exposure light.

108. A method for making a projection exposure apparatus according to claim 98, further comprising an optical member disposed between the light source and the mask, wherein the area illuminated by the exposure light is defined by the changeable member and the optical member.

109. A method for making a projection exposure apparatus according to claim 108, wherein the changeable member is arranged in a plane conjugate with a pattern of the mask.

110. A method for making a projection exposure apparatus according to claim 108, wherein the optical member is apart from the changeable member in a direction along an optical path of the exposure light.

111. A method for making a projection exposure apparatus according to clam 108, wherein the optical member is fixed, and wherein the changeable member includes a movable member that moves relative to the optical member.

112. A method for making a projection exposure apparatus according to claim 111, wherein the movable member is disposed in a plane conjugate with a pattern of the mask, and wherein the optical member is apart from the movable member in a direction along an optical path of the exposure light.

113. A method for making a projection exposure apparatus according to claim 98, wherein said selector selects at least one of detection points located within an area illuminated by the exposure light on the substrate.

114. A method for making a projection exposure apparatus according to claim 113, wherein:

said selector comprises a main control system; and said main control system controls the changeable member and the selection of the detection points.

115. A method for making a projection exposure apparatus according to claim 114, wherein:

said changeable member comprises a blind member masking the exposure light; and said main control system controls the changeable member according to masking information of the blind member.

116. A method for making a projection exposure apparatus according to claim 114, wherein said main control system calculates an optimum focal position of the substrate according to the position information of the detection points selected by the selector.

117. A method for making a projection exposure apparatus according to claim 116, wherein said surface position adjusting member adjusts a focal position of the substrate according to the optimum focal position.

118. A method for making a projection exposure apparatus according to claim 114, wherein said main control system calculates a leveling amount of the substrate surface according to the positional information of the detection points selected by the selector.

119. A method for making a projection exposure apparatus according to claim 118, wherein said surface position adjusting member adjusts an inclination of the substrate surface according to the leveling amount.

120. A method for making a projection exposure apparatus according to claim 118, wherein said a leveling amount comprises a pitching amount and a rolling amount of the substrate surface.

121. A projection exposure method for transferring a pattern formed on a mask through a projection optical system onto a shot area on a substrate, the projection exposure method comprising:

transmitting at least one of luminous flux on a plurality of chip areas respectively within the shot area; and detecting positional information of each of the chip areas in the direction of an optical axis of the projection optical system by detecting the luminous flux from the substrate.

* * * * *

UNITED STATES PATENT AND TRADEMARK OFFICE

CERTIFICATE OF CORRECTION

PATENT NO.    : 5,998,801
DATED         : December 7, 1999
INVENTOR(S)   : IMAI, Yuji It is certified that error appears in the above-identified patent and that said letters patent is hereby corrected as shown below:

Title Page, [30] Foreign Application Priority Data, delete "8-189511" and insert -- 8-139511 --.

Signed and Sealed this

Fourteenth Day of November, 2000

Attest:

Q. TODD DICKINSON

*Attesting Officer*            *Director of Patents and Trademarks*